United States Patent
Abe et al.

[19]

[11] Patent Number: 6,049,343

[45] Date of Patent: Apr. 11, 2000

[54] GRAPHICS PROCESSING UNIT AND GRAPHICS PROCESSING SYSTEM

[75] Inventors: Yuichi Abe; Ryo Fujita; Katsunori Suzuki; Kazuhisa Takami; Kazunori Oniki, all of Hitachi, Japan

[73] Assignee: Hitachi, Ltd., Tokyo, Japan

[21] Appl. No.: 09/009,588

[22] Filed: Jan. 20, 1998

[30] Foreign Application Priority Data

Jan. 20, 1997 [JP] Japan ..................................... 9-007240
Jan. 24, 1997 [JP] Japan ..................................... 9-010918

[51] Int. Cl.$^7$ ................................ G06T 1/00; G06F 15/00
[52] U.S. Cl. .......................... 345/501; 345/507; 708/204
[58] Field of Search .......................... 345/501, 523–525, 345/502; 708/204, 209, 490, 495

[56] References Cited

U.S. PATENT DOCUMENTS

| | | | |
|---|---|---|---|
| 4,620,292 | 10/1986 | Hagiwara et al. | 708/501 |
| 4,631,696 | 12/1986 | Sakamoto | 708/204 |
| 5,392,393 | 2/1995 | Deering | 345/505 |
| 5,521,856 | 5/1996 | Shiraishi | 708/628 |
| 5,528,741 | 6/1996 | Lucas | 345/531 |
| 5,886,711 | 3/1999 | Rossin et al. | 345/503 |

FOREIGN PATENT DOCUMENTS 8-161525  6/1996  Japan ............................. G06T 15/00

OTHER PUBLICATIONS

Haruhiko Okamura, "Latest Algorithm Ductionary in C Language", p. 105–106, p. 162–163, p. 304, published by Gijutu Hyouronsha, Feb. 25, 1991.

*Primary Examiner*—Kee M. Tung
*Attorney, Agent, or Firm*—Kenyon & Kenyon

[57] ABSTRACT

A device for controlling the table capacity smaller comprises a table of logarithms and a table of exponents preserving values of a logarithmic function and exponential function with a base of the second power, a multiplier, a shift unit for shifting the input value by a proper integer when the domain of logarithm is not included in the input value range of the table of logarithms, a logarithm addition unit for adding the shift amount to the value referred to in the table of logarithms, an exponent subtraction unit for subtracting a proper integer L from the input value when the domain of the exponential function is not included in the input value range of the table of exponents, and an exponent shift unit for shifting the referred value in the table of exponents the subtraction amount. A high-speed processing unit comprises a converter for converting floating-point data to fixed-point data having a bit of decimal point. By doing this, a structured graphics system can perform high-speed processing with a small table capacity.

12 Claims, 23 Drawing Sheets

GRAPHICS PROCESSING UNIT AND GRAPHICS PROCESSING SYSTEM

BACKGROUND OF THE INVENTION

Conventionally, with respect to the multiplication for obtaining XN for two digital numerical data X and N, as described in Haruhiko Okumura, "Latest Algorithm Dictionary in C language", p. 105 and 106, p. 162 and 163, and p. 304 published from Gijutsu Hyoronsha, Feb. 25, 1991, a method that a technique of obtaining a logarithm and an exponent by loop calculation by performing expansion into power series or expansion into continued fraction for the logarithmic function and exponential function is used, and the logarithm of X is calculated on a software basis, and the result is multiplied by N, and finally the exponent of the multiplication result is calculated is used.

As another method, a method that an address is directly generated from the aforementioned two digital numerical data X and N and the power table (ROM, RAM) is referred to is used.

As mentioned above, in the conventional examples, a problem arises that in the former case, loop calculation is generated and speeding-up of the process is difficult and in the latter case, since the two data X and N are inputted to the table, the gradient of the input values to the table is the product of the gradation number of X and the gradation number of N, accordingly the table capacity is increased.

On the other hand, as a conventional graphics processing unit, for example, the processing unit described in Japanese Patent Application Laid-Open 8-161525 is known.

These conventional graphics processing units generally comprise a geometry unit for performing geometric calculation such as coordinate transformation or clipping process and a rendering unit for transforming graphics such as a straight line, a triangle, or others to pixels and performing the drawing process.

In such a graphics processing unit, when an image obtained by projecting various 3D graphics data is to be generated, firstly the geometry unit performs perspective transformation of a three-dimensional shape to two-dimensional coordinates, the clipping process, calculation of the brightness of the light source, and others and then the rendering unit expands data of a straight line, a triangle, or others which is graphics data obtained by projection transformation of the three-dimensional shape to two-dimensional coordinates by the geometry unit to pixels, performs operations of Z comparison or alpha blending, and stores an image in the frame memory.

In such a graphics processing unit, the geometry unit is generally realized as a processor chip and operations of the geometry unit are performed by handling each data as a floating-point number so as to prevent limitation of the numerical range and reduction in the operation accuracy.

On the other hand, the rendering unit is also generally realized as a processor chip but operations thereof are performed by handling each data as a fixed-point number. The reason is that it is difficult to perform operations to be performed by the rendering unit by a floating-point number from a viewpoint of circuit scale and operation speed.

The bit position of the decimal point of a fixed-point number handled in the rendering unit generally varies with the kind of data. The reason is that the accuracy required to generate a good quality image varies with the kind of data.

As mentioned above, in a conventional graphics processing unit, the geometry unit handles data by a floating-point number and the rendering unit handles data by a fixed-point number, so that the number representation of data to be handled is different between the two units. Therefore, conventionally, the geometry unit transforms data after operation from the floating-point number to a fixed-point number and transfers the data transformed to the fixed-point number to the rendering unit. For example, in the processing unit described in Japanese Patent Application Laid-Open 8-161525 mentioned above, by showing a number obtained by multiplying a floating-point number by 4096 in integer representation, the data shown in this integer representation shows the number correctly as a fixed-point number with the fraction part 12 bits long.

As mentioned above, in a conventional graphics processing unit, it is necessary to transform a floating-point number to a fixed-point number in the geometry unit. The content of transformation to a fixed-point number varies with the kind of data because the bit position of the decimal point of a fixed-point number required by the rendering unit varies with the kind of data.

Since the geometry unit transforms from a floating-point number to a fixed-point number as mentioned above, the burden of the geometry unit is increased and since the computing element of the geometry unit is used for transformation from a floating-point number to a fixed-point number during this period, the geometry unit cannot perform the intrinsic process such as coordinate transformation and the throughput of the whole graphics processing unit reduces. When the geometry unit is operated by a program, it is necessary to define the transformation procedure from a floating-point number to a fixed-point number which varies with the kind of data in the program.

SUMMARY OF THE INVENTION

An object of the present invention is to provide a device for using no loop calculation, referring to a small-capacity table, and performing power calculation at high speed.

To accomplish this object, the present invention provides a logarithm calculation unit for calculating and outputting a logarithmic value of X for an input value of X by referring to a table of logarithms, a multiplier for multiplying an output of the logarithm calculation unit by another value of N, and an exponent calculation unit for calculating and outputting an exponential value for an output of the multiplier by referring to a table of exponents and so as to reduce the table capacity more, the present invention provides a logarithm shift unit for multiplying an input of the logarithm calculation unit by 2L for an appropriate integer L when the aforementioned input value is not included in the input value range of the table of logarithms and a logarithm adding unit for setting the multiplication result as input of the table of logarithms and referring to the table of logarithms and then adding L to the referred value and setting it as output of the logarithm calculation unit in the logarithm calculation unit and provides an exponent subtraction unit for subtracting an appropriate integer M from input of the exponent calculation unit when the aforementioned input value is not included in the input value range of the table of exponents and an exponent shift unit for setting the subtraction result as input of the table of exponents and referring to the table of exponents and then multiplying the referred value by 2-M and setting it as output of the exponent calculation unit in the exponent calculation unit.

The tables of logarithms and exponents mentioned above indicate a general circuit for calculating not only a RAM and ROM but also a value of the logarithmic function or exponential function for an input value within a given time.

Namely, according to the present invention, when power calculation of XN is to be performed for input values of X and N, a logarithm logaX with a base of "a" is obtained by referring to the table of logarithms, and logaX×N is calculated by the multiplier, and alogaX×N=XN which is the logaX×N power of a is calculated by referring to the table of exponents. Since the present invention does not perform loop calculation, high speed calculation is possible. By dividing the table into two parts such as the table of logarithms and table of exponents, inputs of the tables can be unified to one and the capacity of each table can be reduced.

To reduce the table capacity more, the present invention multiplies, when an input value of the logarithm calculation unit is not included in the input value range of the table of logarithms, the input value by 2L for an appropriate integer L, sets the multiplication result as input of the table of logarithms, refers to the table of logarithms, and then adds L to the referred value, sets it as output of the logarithm calculation unit, and subtracts, when an input value of the exponent calculation unit is not included in the input value range of the table of exponents, an appropriate integer M from the input, sets the subtraction result as input of the table of exponents, refers to the table of exponents, and then multiplies the referred value by 2-M, and sets it as output of the exponent calculation unit.

By doing this, even if input values of the logarithm calculation unit and exponent calculation unit are not included in the input value ranges of the tables of logarithms and exponents, power calculation can be performed. Therefore, the input value range of the tables of logarithms and exponents can be limited and the table capacity can be reduced.

Another object of the present invention is to provide a graphics processing unit for decreasing the reduction in the processing speed necessary to transform a floating-point number to a fixed-point number.

To accomplish this object, the present invention is a graphics processing unit having a processor for outputting graphic data including a floating-point data string which represents information for specifying a graphic to be drawn in the floating point format and a rendering unit for expanding and outputting a graphic to pixels according to drawing data including a fixed-point data string which represents the content of a graphic to be drawn in the fixed-point format, wherein the graphics processing unit has a data converter for converting floating-point data included in graphic data outputted by the processor to fixed-point data and outputting it to the rendering unit as drawing data and the data converter has a decimal point position changing means for changing the bit position of the decimal point of fixed-point data to which floating-point data is to be converted.

According to this graphics processing unit of the present invention, the data converter for converting floating-point data to fixed-point data is installed between the processor and the rendering unit, so that the processing of the processor and the transformation from floating-point data to fixed-point data can be performed on a pipeline basis and high-speed graphics processing can be performed.

Furthermore, for each floating-point data, the bit position of the decimal point of fixed-point data to which the floating-point data is to be converted can be changed, so that various data can be processed.

PREFERRED EMBODIMENTS

The embodiments will be explained hereunder with reference to the accompanying drawings.

Figure 8:
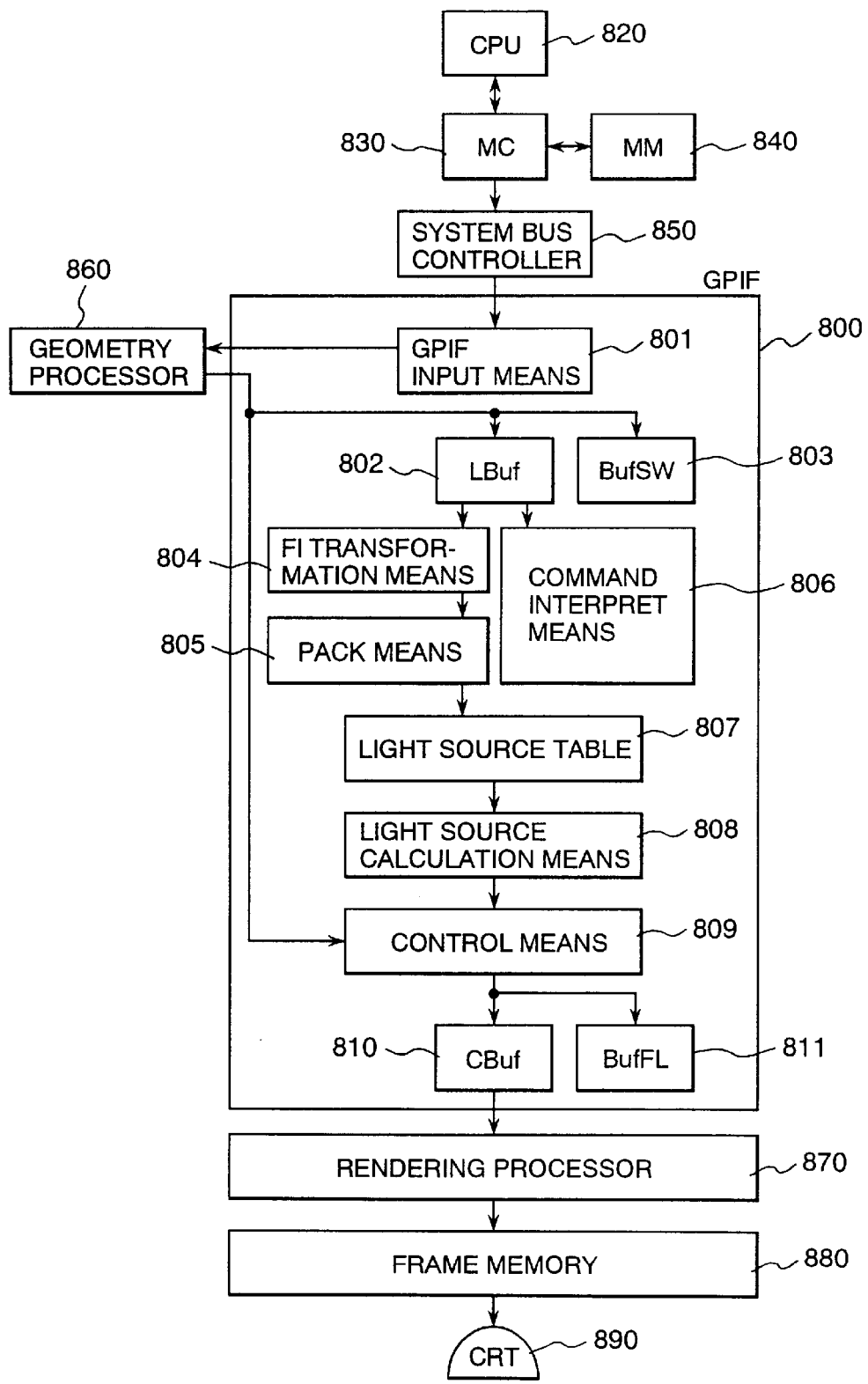
FIG. 8 is a drawing showing the constitution of a graphics system.

FIG. 8 shows a constitution example of a graphics system using the digital power arithmetic unit of the present invention. The system comprises a CPU 820 for executing application software and others, a memory controller MC 830 for controlling a main memory MM 840 and others, a system bus controller 850 for controlling the system bus, GPIF 800 for sending data received from the system bus controller to a geometry processor 860 for performing coordinate transformation and others and performing processes such as FI transformation, packing, light source calculation, and others for data returned from the geometry processor, a rendering processor 870 for expanding data sent from GPIF 800 to pixel information, a frame memory 880 for storing pixel information generated by the rendering processor 870, and CRT 890 for displaying contents of the frame processor 880.

Next, the operation of the whole system will be explained.

The CPU 820 executes an application, issues a graphics command, vertex coordinates of a graphic to be drawn, a normal vector, texture data, each reflection coefficient of materials, and data such as color of each reflected light of the light source, and outputs them to the GPIF 800 via the MC 830 and the system bus controller 850. The GPIF 850 preserves the command and data sent from the system bus controller 850 at a GPIF input means 801.

The geometry processor 560 reads the command and data preserved at the GPIF input means 801, performs geometric calculation such as coordinate transformation and others according to the command and data, calculates the vertex coordinates, normal vector, texture data, and others, and sends them to the GPIF 800.

The GPIF 800 performs FI transformation and packing, if necessary, for the data sent from the geometry processor 860 according to the command and data, performs light source calculation for calculating the color for each vertex, and outputs the continuous triangle drawing command, vertex coordinates, colors, and texture data to the rendering processor 870.

The rendering processor 870 generates pixels inside the graphic from the command and data by interpolation, writes the content to be displayed on the CRT 890 into the frame memory 880 in the bit map format, and displays an image on the CRT 890.

Furthermore, the internal constitution of the GPIF 800 will be explained in detail.

The GPIF 800 comprises a GPIF input means 801 which is a buffer for preserving the command and data sent from the system bus controller 850, LBuf 802 which is a buffer for preserving data sent from the geometry processor 860 for reading a command and data and performing geometric calculation, a BufSW register 803 for outputting a command and data to a command interpretive means 806 and an FI transformation means 804 from the LBuf 802, a command interpretive means 806 for interpreting a command, the FI transformation means 804 for performing FI transformation of data, if necessary, according to the command, a packing means 805 for performing the packing process of data after FI transformation, if necessary, according to the command, a light source table 807 for preserving light source data necessary for light source calculation after the FI transformation and packing process, a light source calculation means 808 for performing light source calculation on the basis of the light source data preserved by the light source table 807 and calculating colors, a control means 809 for controlling the order of commands and data sent from the geometry processor 860, the packing means 805, and the light source calculation means 808, CBuf 810 which is a buffer for preserving a command and data, and a BufFL register 811 for outputting a command and data to the rendering processor 870.

Figure 10:
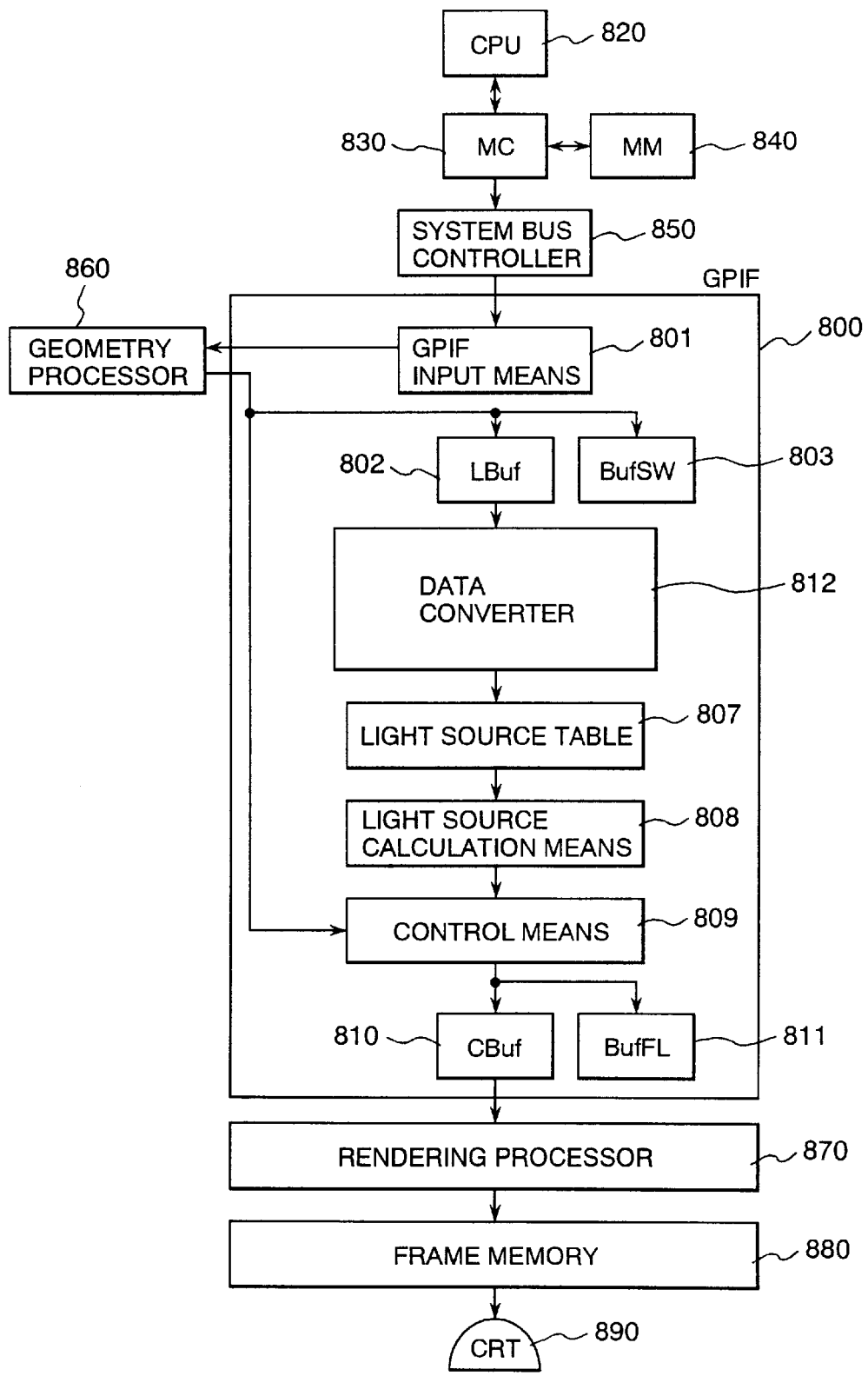
FIG. 10 is a drawing showing the constitution of a light source table and a light source calculation means.

FIG. 10 shows another constitution example of a graphics system using the digital power arithmetic unit of the present invention.

The graphics system shown in FIG. 10 is different only in the internal constitution of the GPIF 800 from the graphics system shown in FIG. 8, so that only the internal constitution of the GPIF 800 will be explained in detail.

The GPIF 800 comprises a GPIF input means 801 which is a buffer for preserving the command and data sent from the system bus controller 850, LBuf 802 which is a buffer for preserving data sent from the geometry processor 860 for reading a command and data and performing geometric calculation, a BufSW register 803 for outputting a command and data to a data converter 812 from the LBuf 802, a data converter 812 for transforming data, if necessary, from the floating-point format to the fixed-point format according to the command, a light source table 807 for preserving light source data necessary for light source calculation after data transformation, a light source calculation means 808 for performing light source calculation on the basis of the light source data preserved by the light source table 807 and calculating colors, a control means 809 for controlling the order of commands and data sent from the geometry processor 860 and the light source calculation means 808, CBuf 810 which is a buffer for preserving a command and data, and a BufFL register 811 for outputting a command and data to the rendering processor 870.

The light source table 807 and the light source calculation means 808 shown in FIG. 10 are the same as the light source table 807 and the light source calculation means 808 shown in FIG. 8. The data converter shown in FIG. 10 will be explained in FIG. 11 and the subsequent drawings.

Figure 9:
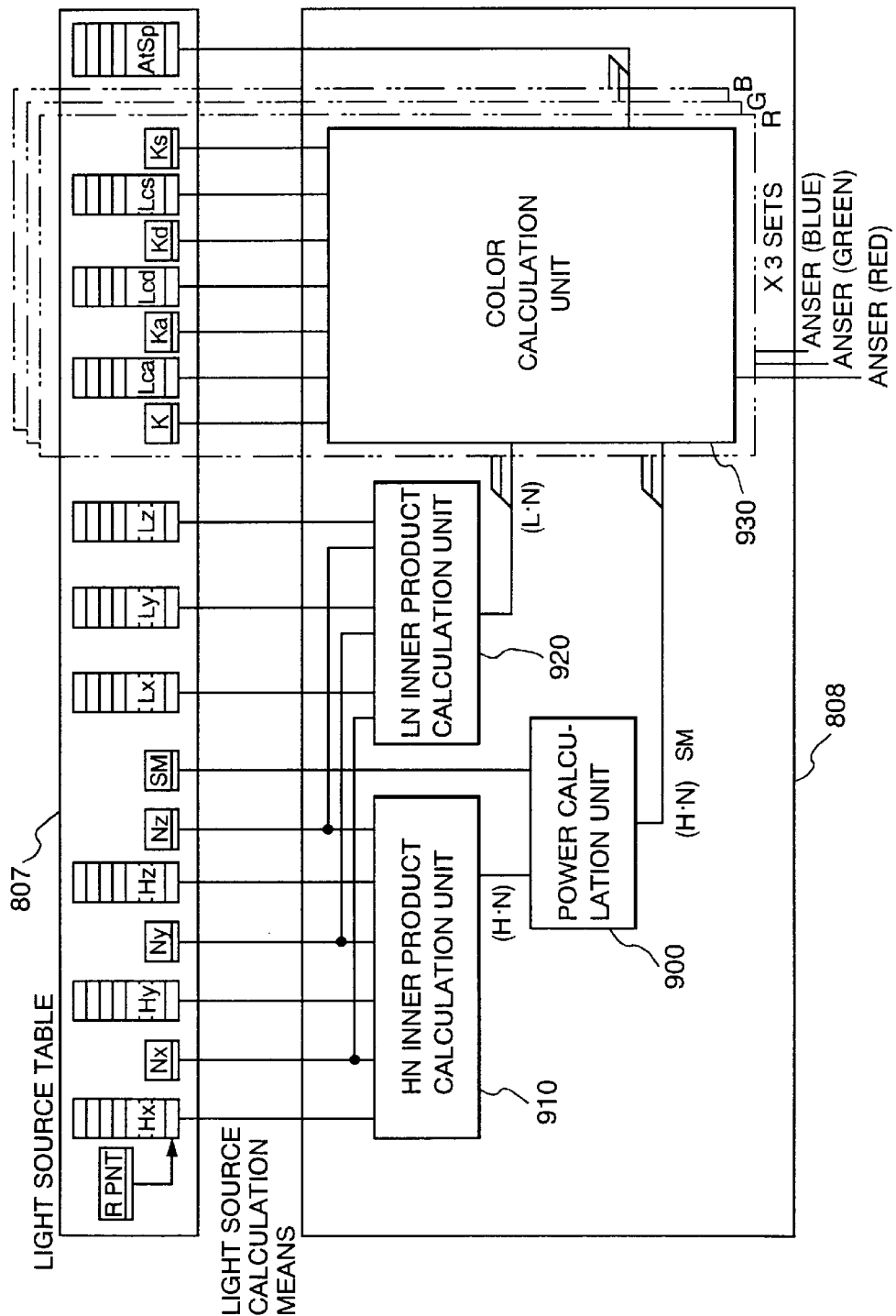
FIG. 9 is a drawing showing the constitution of a light source table and a light source calculation means.

In FIG. 9, the light source table 807 and the light source calculation means 808 will be described in detail.

The light source table 807 preserves parameters necessary for light source calculation in a fixed-point number. These parameters are divided into parameters which do not depend on the light source and parameters whose values vary depending on the light source. The light source table 807 preserves one parameter value independent of the light source respectively and 8 parameter values dependent on the light source respectively (for 8 light sources). When the number of light sources is 9 or more, the values already used for calculation are updated to new light source values sequentially one by one.

To perform this writing control for the parameters independent of the light source, a read pointer for indicating which value is under calculation among the eight values at present and a RPNT register are provided and values after the RPNT are locked and the updating is postponed.

The light source calculation means 808 comprises an HN inner product calculation unit 910 for calculating the inner product of the normal vector and halfway vector, a power calculation unit 900 for calculating the SM power of the inner product, an LN inner product calculation unit 920 for calculating the inner product of the normal vector and light source vector, and a color arithmetic unit 930 for calculating the color of each vertex using outputs of the power calculation unit 900 and the LN inner product calculation unit 920.

The HN inner product calculation unit 910 calculates the inner product of the normal vector (Nx,Ny,Nz) and the halfway vector (Hx,Hy,Hz) and outputs the result 13 bits long to the power calculation unit 900.

The power calculation unit 900 multiplies the output of the HN inner product calculation unit 910 by the mirror exponent SM (an integer from 1 to 128) of the material and outputs the result 8 bits long to the color arithmetic unit 930.

The LN inner product calculation unit 920 calculates the inner product of the normal vector (Nx,Ny,Nz) and the light source vector (Lx,Ly,Lz) and outputs the result to the color arithmetic unit 930.

The color arithmetic unit 930 calculates the three colors RGB independently, so that it has 3 sets of same resources. For example, with respect to R, the color arithmetic unit 930 inputs the R component LcaR of the environment reflected light, the R component LcdR of the diffuse reflected light, the R component LcsR of the mirror reflected light, the R component KaR of the environment reflection coefficient, the R component KdR of the diffuse reflection coefficient, the R component KsR of the mirror reflection coefficient, the sum KR of the R components of the radiation reflected light and the whole environment reflected light, the product AtSp of the damping coefficient and the spot light source effect, the output of the power calculation unit 900, and the output of the LN inner product calculation unit 920 and outputs the R component of the color of the vertex 8 bits long.

Figure 1:
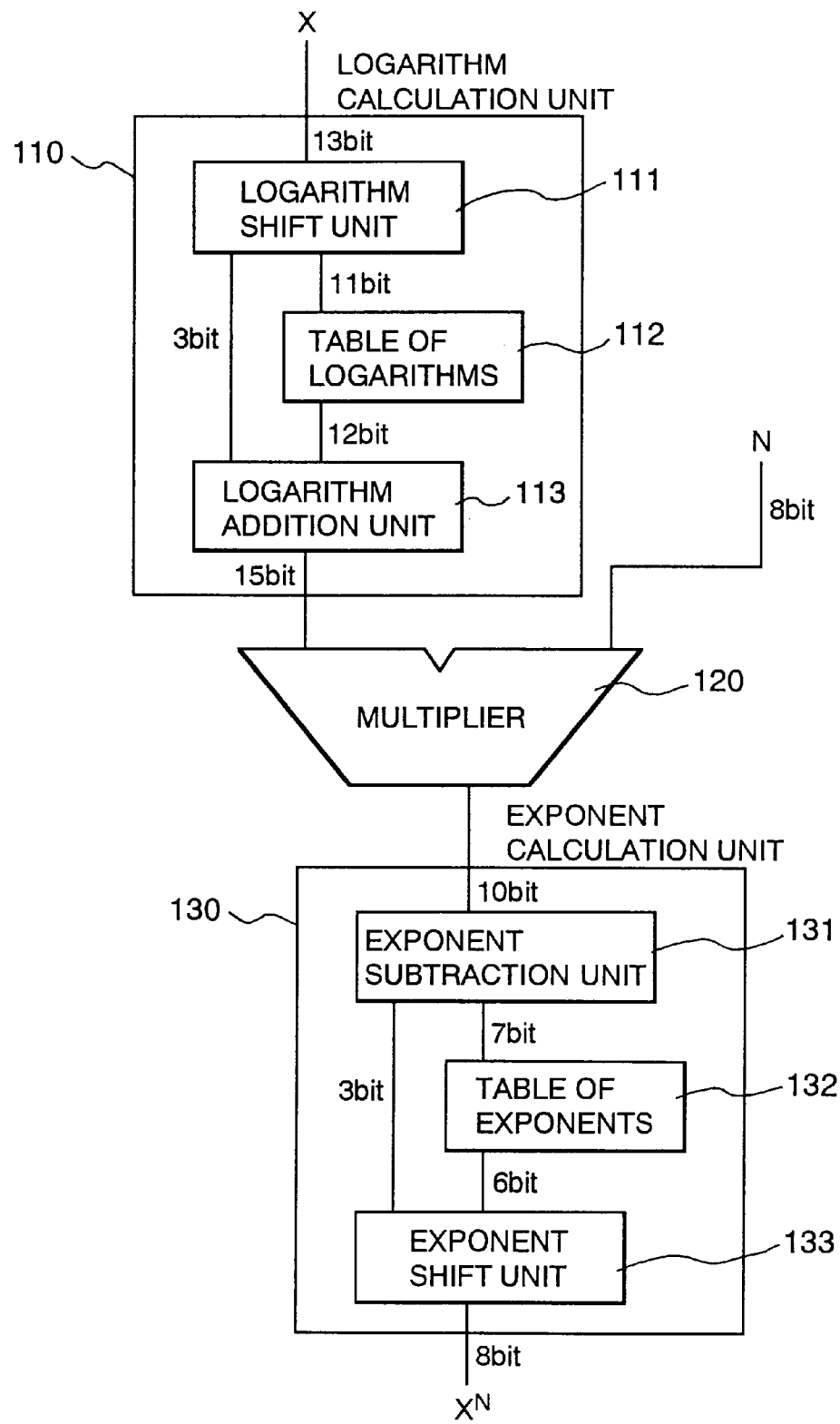
FIG. 1 is a drawing showing the circuit constitution of a digital power arithmetic unit.

The constitution of the power calculation unit 900 is shown in FIG. 1.

For reason of explanation, input is assumed as X or N and output as XN. Namely, X and N correspond to the output of the HN inner product calculation 910 and the mirror exponent SM of the material in the above explanation. X is a fixed-point number 13 bits long and the range thereof is from 0 to 1, and N is a fixed-point number 8 bits long and the range thereof is from 0 to 128, and XN is a fixed-point number 8 bits long and the range thereof is from 0 to 1.

This circuit comprises a logarithm calculation unit 110 for calculating the value of the logarithmic function for input X in a fixed-point number 15 bits long, a multiplier 120 for multiplying the output of the logarithm calculation unit 110 by N and outputting a fixed-point number 10 bits long, and an exponent calculation unit 130 for calculating the value of the exponential function for the output of the multiplier 120 in a fixed-point number 8 bits long.

In this case, when the logarithm calculation unit 110 and the exponent calculation unit 130 are set as tables as they are, in the table of logarithms, the input range is from 0 to 1 and 13 bits long and the output range is from 0 to 8 (strictly speaking, 8 is not included) and 15 bits long and in the table of exponents, the input range is from 0 to 8 (strictly speaking, 8 is not included) and 10 bits long and the output range is from 0 to 1 and 8 bits long and when they are converted to memory capacity, they will be enormous capacities such as 122880 bits and 8192 bits respectively.

However, when the tables of logarithms and exponents are degraded, that is, the input and output ranges are limited and the logarithm calculation unit 110 and the exponent calculation unit 130 are structured as shown below, the capacity of each table can be reduced extensively (24576 bits and 768 bits when converted to memory capacity) and calculation with the same accuracy as that before degradation is made possible.

Namely, the logarithm calculation unit 110 comprises a logarithm shift unit 111 for shifting the input value left K bits until it enters the input range of a degraded table of logarithms 112 (multiplied by 2K) and outputting a shift amount of K 3 bits long and the shift result 11 bits long, the degraded table of logarithms 112 for outputting the value of the logarithmic function for the shift result as a fixed-point number 12 bits long, and a logarithm addition unit 113 for adding K to the output of the logarithm table 112 and outputting a fixed-point number 15 bits long and the exponent calculation unit 130 comprises an exponent subtraction unit 131 for subtracting M from the input value until it enters the input range of a degraded table of exponents 132 and outputting the subtraction amount 3 bits long and the subtraction result 3 bits long, the degraded table of exponents 132 for outputting the value of the exponential function for the subtraction result as a fixed-point number 6 bits long, and an exponent shift unit 133 for shifting the output of the table of exponents 132 right M bits.

Figure 2:
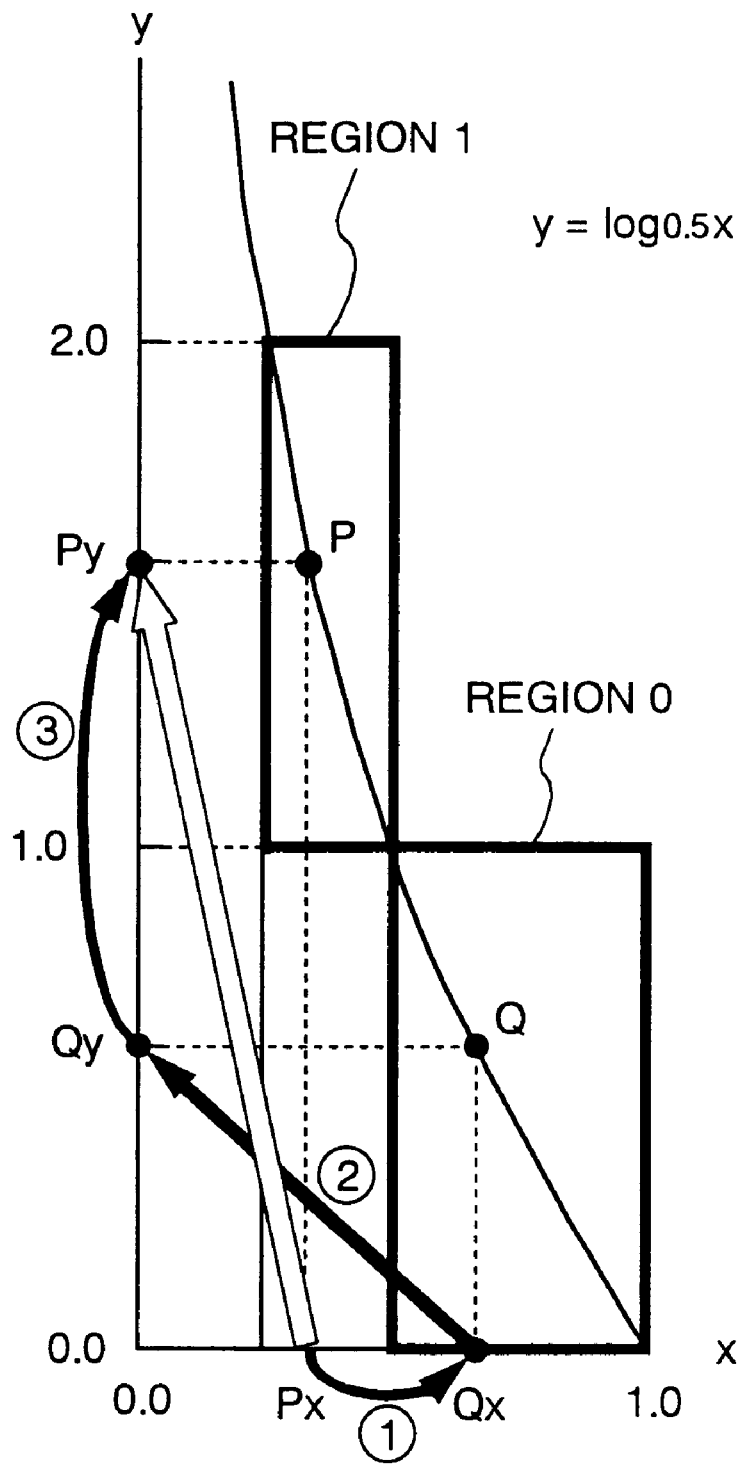
FIG. 2 is a drawing showing the operation of a logarithm calculation unit.

The operation when the logarithm calculation unit 110 calculates output Py for input Px (this operation is indicated by the void arrow) by referring to FIG. 2.

The graph shown in FIG. 2 indicates a part of a logarithmic function having a domain from 0 to 1 (strictly speaking, 0 is not included) and a range of values from 0 to 8 (strictly speaking, 8 is not included) with a base of $2^{-1}$=0.5. In this case, the domain means a variability domain of input value x and the range of values means a variability domain of output value y accompanying a variation of x.

The region 0 indicates a portion of a domain from 0.5 to 1 (strictly speaking, 0.5 is not included) and a range of values from 0 to 1 (strictly speaking, 1 is not included). The table of logarithms (12) preserves logarithmic functions within this range. Namely, although the domain of the whole graph is from 0 to 1, the domain within the range preserved by the table of logarithms 112 is degraded to 1/2 of the domain of the whole graph such as from 0.5 to 1 and although the range of values of the whole graph is from 0 to 8, the range of values within the range preserved by the table of logarithms 112 is degraded to 1/8 of the range of values of the whole graph such as from 0 to 1.

The region 1 indicates a portion of a domain from 0.25 to 0.5 (strictly speaking, 0.25 is not included) and a range of values from 1 to 2 (strictly speaking, 2 is not included) and from the property of the logarithmic function, the region 1 is a region obtained by multiplying x by 2-1 and adding 1 to y in the region 0.

Generally, the region K (K is an integer from 0 to 7) indicates a portion of a domain from $2^{-K-1}$ to $2^{-K}$ (strictly speaking, $2^{-K-1}$ is not included) and a range of values from K to K+1 (strictly speaking, K+1 is not included) and from the property of the logarithmic function, the region K is a region obtained by multiplying x by $2^{-K}$ and adding K to y in the region 0.

The logarithm shift unit 111 multiplies Px by $2^K$ (shifted left K) depending on which domain in the region K Px is included in and shifts it up to the domain in the region 0.

For simplicity, Px is assumed to be included in the domain in the region 1 and the result of multiplying Px by 21 (1 shift) is assumed as Qx (this operation is indicated by the arrow (1)). Qx is included in the input value range in the table of logarithms (12), so that Qy can be obtained by referring to the table of logarithms (12) (this operation is indicated by the arrow (2)).

Finally, the logarithm addition unit 113 adds a shift amount of 1 to Qy and calculates Py (this operation is indicated by the arrow (3)).

Figure 3A:
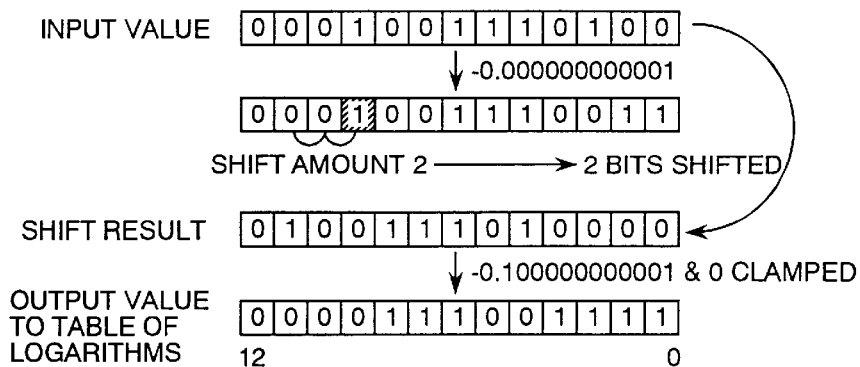
FIG. 3 is a drawing showing the operation of a logarithm shift unit.
Figure 3B:
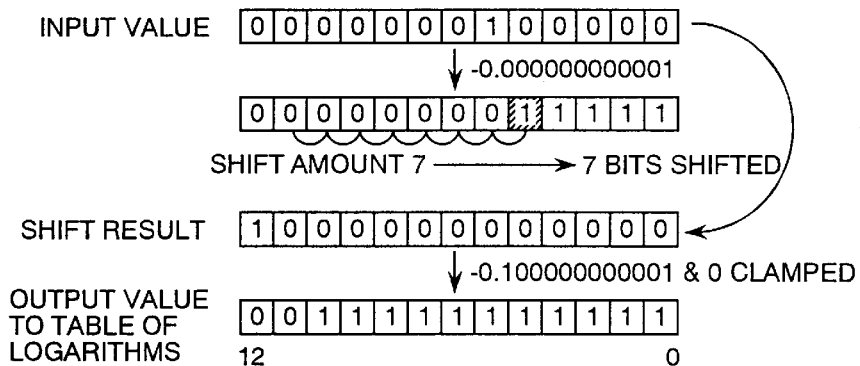
Figure 3C:
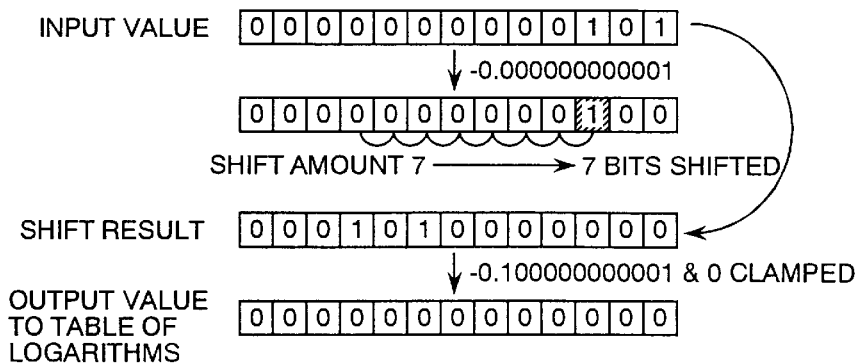

The operation of the logarithm shift unit 111 will be described by referring to FIG. 3.

The logarithm shift unit 111 shifts the input value in the domain in the region K left until it enters the domain in the region 0 and outputs the shift amount and shift result at that time.

For example, the domain in the region 2 is from $2^{-3}$ to $2^{-2}$ and from 0.001000000001 to 0.010000000000 when it is indicated in a fixed-point number 13 bits long. However, the shift amount when a value of 0.001010011101 in this domain is shifted left up to a domain from 0.100000000001 to 1.000000000000 in the region 0 agrees with the shift amount when the value is shifted left until 1 at the high-order position of 0.001010011100 obtained by subtracting 0.000000000001 from the value 0.001010011101 moves to the second position from the high-order position. In this case, the shift amount is 2.

The reason that 0.000000000001 is subtracted is that the maximum value in the region such as 0.010000000000 is also handled without exception. In this case, when the value is shifted until 1 at the high-order position moves to the second position from the high-order position instead of subtracting 0.000000000001, 0.100000000000 is obtained and is not included in the domain in the region 0.

The domain in the region 0 is from 0.5 to 1 (strictly speaking, 0.5 is not included) 13 bits long. However, when the domain is set to 0 to 0.5 (strictly speaking, 0.5 is not included) by subtracting 0.5, that is, a fixed-point number 0.100000000001 13 bits long, the upper two bits are always set to 00. By use of this, when input of the table of logarithms 112 is set to the lower 11 bits by removing the upper two bits which are always set to 00 from the 13 bits of the input, 2 bits can be saved from the number of input bits. Therefore, the value of 11 bits obtained by subtracting the fixed point number 0.100000000001 13 bits long from the shift result and removing the upper two bits is assumed as output to the table of logarithms 112.

The shift amount is 7 at maximum. The reason is that even if shifted left 7 bits, a value which is not included in the domain in the region 0 is smaller than 2-8 and will not appear in the power result with the accuracy of 8 bits. In such a case, when the fixed point number 0.100000000001 13 bits long is subtracted, the result becomes less than 0, so that the output value is set to 0.000000000000 by clamping 0.

In the case of (a), the input value is 0.001001110100 and the value obtained by subtracting 0.000000000001 is 0.001001110011. When 1 at the high-order position of the value is shifted left 2 bits, it moves to the second digit from the high-order position, so that the shift amount is 2. Therefore, 0.100111010000 obtained by shifting the input value 0.001001110100 left 2 bits is the shift result. The output value is 0.000111001111 obtained by subtracting 0.100000000001 from the shift result 0.100111010000.

In the case of (b), the input value is 0.000000100000 and the value obtained by subtracting 0.000000000001 is 0.000000011111. When 1 at the high-order position of the value is shifted left 7 bits, it moves to the second digit from the high-order position, so that the shift amount is 7. Therefore, 1.000000000000 obtained by shifting the input value 0.000000100000 left 2 bits is the shift result. The output value is 0.011111111111 obtained by subtracting 0.100000000001 from the shift result 0.100000000000.

In the case of (c), the input value is 0.000000000101 and the value obtained by subtracting 0.000000000001 is 0.000000000100. Even if 1 at the high-order position of the value is shifted left 7 bits, it will not move to the second digit from the high-order position, so that the shift amount is 7 at maximum. Therefore, 0.001010000000 obtained by shifting the input value 0.000000000101 left 7 bits is the shift result. When 0.100000000001 is subtracted from the shift result 1.000000000000, the result is less than 0, so that the output value becomes 0.000000000000 by clamping 0.

Figure 4:
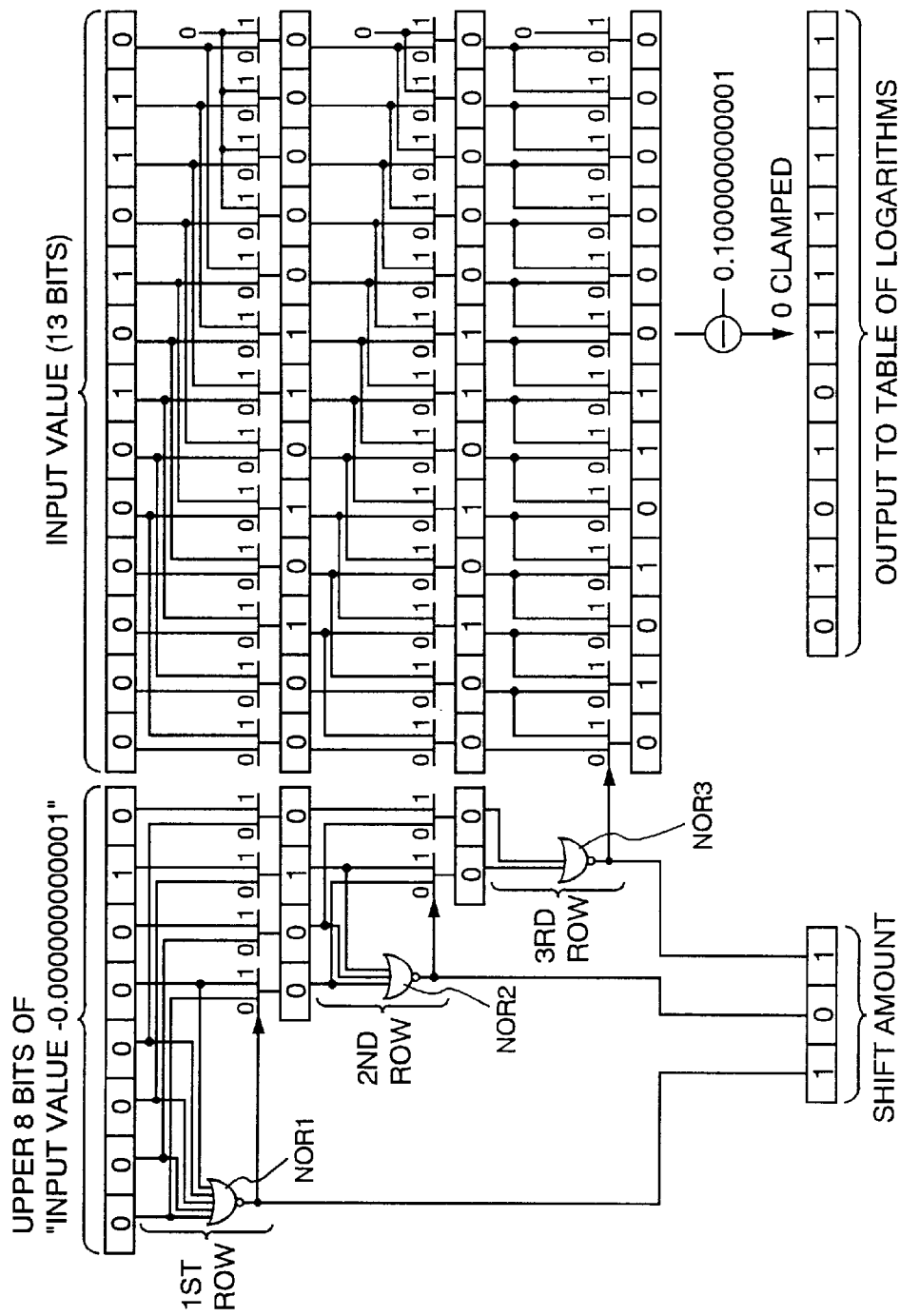
FIG. 4 is a drawing showing the circuit constitution of a logarithm shift unit.

The circuit diagram of the logarithm shift unit 111 which operates as mentioned above is shown in FIG. 4.

Since the shift amount is decided by using the value obtained by subtracting the fixed-point number 0.000000000001 13 bits long from the input value as mentioned above, the logarithm shift unit 111 performs this subtraction immediately after input. In the uppermost row shown in FIG. 4, the upper 8 bits of the subtraction result and input value are arranged.

The logic relating to shift is broadly divided into three rows.

In the first row, NOR1 fetches NOR of the upper 5 bits among the upper 8 bits of the subtraction result and decides whether or not to shift the upper 8 bits of the subtraction result and the input value left 4 bits depending on 0 or 1 of this value.

If the output of NOR1 is 1, the upper 5 bits of the subtraction result are all zeros and it means that there is a space for shifting left 4 bits, so that the upper 8 bits of the subtraction result and the input value are shifted left 4 bits. The high-order digit of the shift amount is 1. This means that 4 bits are shifted left.

If the output of NOR1 is 0, 1 is included in the upper 5 bits of the subtraction result and it means that 4 bits cannot be shifted left, so that the upper 8 bits of the subtraction result and the input value will not be shifted left 4 bits. The high-order digit of the shift amount is 0. This means that 4 bits cannot be shifted left.

Next, in the second row, NOR2 fetches NOR of the upper 3 bits of the shift result of the subtraction result in the first row and decides whether or not to shift the subtraction result and the shift result of the input value in the first row left 2 bits more depending on 0 or 1 of this value.

If the output of NOR2 is 1, the upper 3 bits of the shift result of the subtraction result in the first row are all zeros and it means that there is a space for shifting left 2 bits, so that the subtraction result and the shift result of the input value in the first row are shifted left 2 bits. The second digit of the shift amount is 1. This means that 2 bits are shifted left.

If the output of NOR2 is 0, 1 is included in the upper 3 bits of the shift result of the subtraction result in the first row and it means that 2 bits cannot be shifted left, so that the subtraction result and the shift result of the input value in the first row will not be shifted left. The second digit of the shift amount is 0. This means that 2 bits cannot be shifted left.

Next, in the third row, NOR3 fetches NOR of the upper 2 bits of the shift result of the subtraction result in the second row and decides whether or not to shift the subtraction result and the shift result of the input value in the second row left 1 bit more depending on 0 or 1 of this value.

If the output of NOR3 is 1, the upper 2 bits of the shift result of the subtraction result in the second row are all zeros and it means that there is a space for shifting left 1 bit, so that the subtraction result and the shift result of the input value in the second row are shifted left 1 bit. The low-order digit of the shift amount is 1. This means that 1 bit is shifted left.

If the output of NOR3 is 0, 1 is included in the upper 2 bits of the shift result of the subtraction result in the second row and it means that 1 bit cannot be shifted left, so that the subtraction result and the shift result of the input value in the second row will not be shifted left. The low-order digit of the shift amount is 0. This means that 1 bit cannot be shifted left.

On this stage, the shift amount 3 bits long is decided. However, the output value to the table of logarithms is a value obtained by subtracting the fixed-point number 0.100000000001 13 bits long from the shift result of the input value in the third row and then clamping 0.

Next, the table of logarithms 112 will be explained.

The input of the table of logarithms 112 is a fixed-point number 11 bits long in the input value range from 0 to 0.5 (strictly speaking, 0.5 is not included) as mentioned above.

The output of the table of logarithms 112 is a value which is obtained by indicating the value of the logarithmic function of a value obtained by adding the fixed-point number 0.100000000001 13 bits long to the input value in a fixed-point number 12 bits long and the output value range is from 0 to 1 (strictly speaking, 1 is not included). The table of logarithms 112 may be structured so that a RAM and ROM are incorporated and an input value is transformed to an address and referred to. However, in this embodiment, an output logical value is represented by a logical expression of an input logical value and the table of logarithms 112 comprises a circuit corresponding to the logical expression.

Assuming the bits of input of the table of logarithms 112 as a0, a1, - - - , and a10 and the bits of output of the table of logarithms 112 as b0, b1, - - - , and b11, b0, b1, - - - , and b11 can be represented by a logical expression of sum of products of a0, a1, - - - , and a10. Furthermore, as a method of setting each term of the sum of products as a main term, the queen method and consensus method are famous. The queen method and consensus method are described in Munehiro Goto, "Computer Engineering for Electric and Electronic Students", p. 40 to 45 published by Maruzen Co., Ltd., Jun. 30, 1983.

It is possible to constitute the table of logarithms 112 by a circuit corresponding to a logical expression generated by one of the aforementioned methods.

As a result of actual logical composition, a 0.35-$\mu$m CMOS requires an about-4 k gate.

Finally, the logarithm addition unit 113 will be explained.

The input of the logarithm addition unit 113 is the shift amount calculated by the logarithm shift unit 111 and the output of the table of logarithms 112.

The logarithm addition unit 113 adds and outputs this shift amount to the output value of the table of logarithms 112.

The output value range of the table is from 0 to 1 (strictly speaking, 1 is not included) and the shift amount is an integer, so that the output of the logarithm addition unit 113 is a fixed-point number 15 bits long which are obtained by adding 3 bits of the shift amount to the high-order position of 12 bits of the output value of the table.

Next, the multiplier 120 will be explained.

The input of the multiplier 120 is an output of the logarithm calculation unit 110 and N.

The multiplier 120 multiplies the output 15 bits long of the logarithm calculation unit 110 by N 8 bits long and outputs the product as a fixed-point number 10 bits long in the output value range from 0 to 8 (strictly speaking, 8 is not included).

When the multiplication result is 8 or more, it is clamped to the maximum output value. The reason is that the power of 8 or more of $2^{-1}$ is smaller than $2^{-8}$ and will not appear in the power result with the accuracy of 8 bits.

Figure 5:
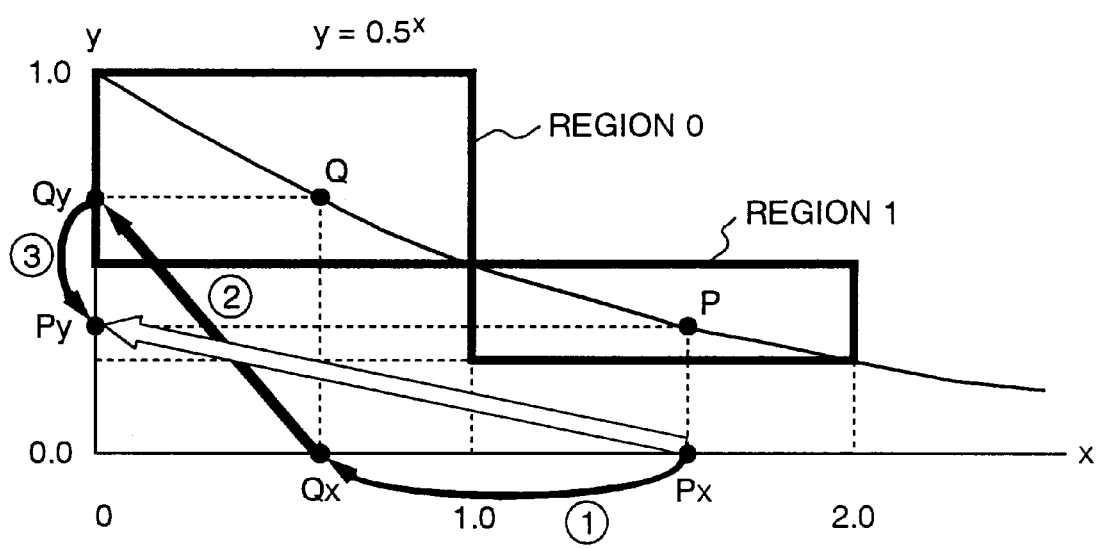
FIG. 5 is a drawing showing the operation of an exponent calculation unit.

The operation when the exponent calculation unit 130 calculates output Py for input Px (this operation is indicated by the void arrow) by referring to FIG. 5.

The graph shown in FIG. 5 indicates a part of an exponential function having a domain from 0 to 8 (strictly speaking, 8 is not included) and a range of values from 0 to 1 (strictly speaking, 0 is not included) with a base of $2^{-1}=0.5$.

The region 0 indicates a portion of a domain from 0 to 1 (strictly speaking, 1 is not included) and a range of values from 0.5 to 1 (strictly speaking, 0.5 is not included) and the table of exponents 132 preserves exponential functions within this range. Namely; although the domain of the whole graph is from 0 to 8, the domain within the range preserved by the table of exponents 132 is degraded to 1/8 of the domain of the whole graph such as from 0 to 1 and although the range of values of the whole graph is from 0 to 1, the range of values within the range preserved by the table of exponents 132 is degraded to 1/2 of the range of values of the whole graph such as from 0.5 to 1. The region 1 indicates a portion of a domain from 1 to 2 (strictly speaking, 2 is not included) and a range of values from 0.25 to 0.5 (strictly speaking, 0.25 is not included) and from the property of the exponential function, the region 1 is a region obtained by adding 1 to x and multiplying y by 2-1 in the region 0.

Generally, the region M (M is an integer from 0 to 7) indicates a portion of a domain from M to M+1 (strictly speaking, M+1 is not included) and a range of values from $2^{-M-1}$ to $2^{-M}$ (strictly speaking, $2^{-M-1}$ is not included) and from the property of the exponential function, the region M is a region obtained by adding M to x and multiplying y by 2-M in the region 0.

The exponent subtraction unit 131 subtracts M from Px depending on which domain in the region M Px is included in and slides it up to the domain in the region 0.

For simplicity, Px is assumed to be included in the domain in the region 1 and the result of subtracting 1 from Px is assumed as Qx (this operation is indicated by the arrow (1)). Qx is included in the input value range in the table of exponents 132, so that Qy can be obtained by referring to the table of exponents 132 (this operation is indicated by the arrow (2)).

Finally, the exponent shift unit 133 shifts Qy right 1 of the subtraction amount (2-1 is multiplied) and calculates Py (this operation is indicated by the arrow (3)).

The logarithm subtraction unit will be explained.

The input of the logarithm subtraction unit 131 is a fixed-point number 10 bits long in the input value range from 0 to 8 (strictly speaking, 8 is not included). As mentioned above, the exponent subtraction unit 131 subtracts M from Px depending on which domain in the region M the value is included in and slides it up to the domain in the region 0. However, M is the upper 3 bits of the input value and a value obtained by subtracting M from the input value is the lower 7 bits of the input value.

Next, the table of exponents 132 will be explained.

The input of the table of exponents 132 is an output of the exponent subtraction unit 131 and is a fixed-point number 7 bits long in the input value range from 0 to 1 (strictly speaking, 1 is not included).

The range of values in the region 0 is from 0.5 to 1 (strictly speaking, 0.5 is not included). However, when the range of values is moved in parallel by –0.5 in the y direction so as to obtain a range of values from 0 to 0.5 (strictly speaking, 0.5 is not included), the upper 2 bits of the output of the table of exponents 132 become 00 and the number of output bits can be reduced by 2 bits.

Therefore, the output of the table of exponents 132 is a fixed-point number 6 bits long obtained by subtracting 0.5, that is, the fixed-point number 0.1000001 8 bits long from the value of the exponential function of the input value which is indicated by a fixed-point number 8 bits long and the output range at this time is from 0 to 0.5 (strictly speaking, 0.5 is not included).

The table of exponents 132 also may be structured so that a RAM and ROM are incorporated and an input value is transformed to an address and referred to. However, in this embodiment, an output logical value is represented by a logical expression of an input logical value and the table of exponents 132 comprises a circuit corresponding to the logical expression.

As a result of actual logical composition, a 0.35-$\mu$m CMOS requires an about-1 k gate.

Figure 6A:
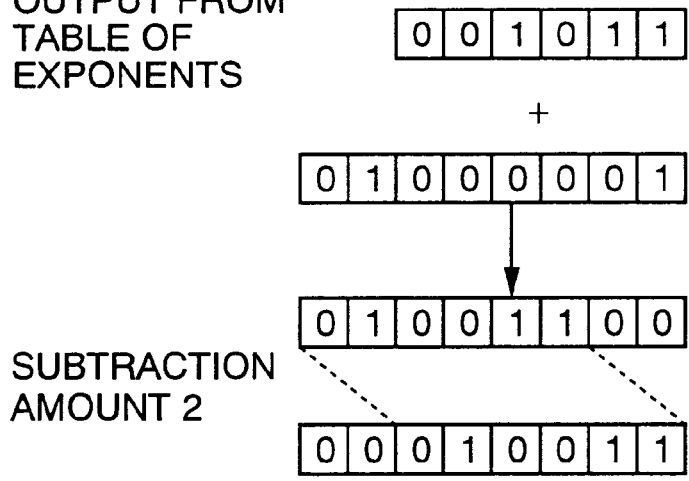
FIG. 6 is a drawing showing the operation of an exponent shift unit.
Figure 6B:
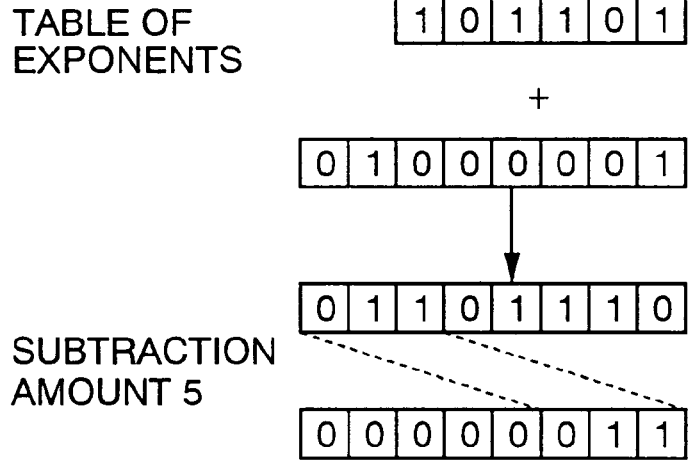

Finally, the operation of the exponent shift unit 133 will be explained by referring to FIG. 6.

The input of the exponent shift unit 133 is the subtraction number which is an output of the subtraction unit and the output of the table of exponents 132.

As mentioned above, since the output of the table of exponents 132 is a fixed-point number 6 bits long obtained by subtracting 0.5, that is, the fixed-point number 0.1000001 8 bits long from the value of the exponential function of the input value which is indicated by a fixed-point number 8 bits long, it is necessary that the exponent shift unit 133 inversely adds 0.5, that is, the fixed-point number 0.1000001 8 bits long to the output of the table of exponents 132 and returns the range of values to 0.5 to 1 (strictly speaking, 0.5 is not included). Next, the exponent shift unit 133 shifts and outputs the value right the subtraction amount.

In the case of (a), when the fixed-point number 0.1000001 8 bits long is added to the output 0.01011 of the table of exponents 132 and it is shifted right 2 of the subtraction amount, an output value of 0.0010011 is obtained. Zeros are put in the upper bits which become empty due to right shifting.

In the case of (b), when the fixed-point number 0.1000001 8 bits long is added to the output 1.01101 of the table of exponents 132 and it is shifted right 5 of the subtraction amount, an output value of 0.0000011 is obtained.

Figure 7:
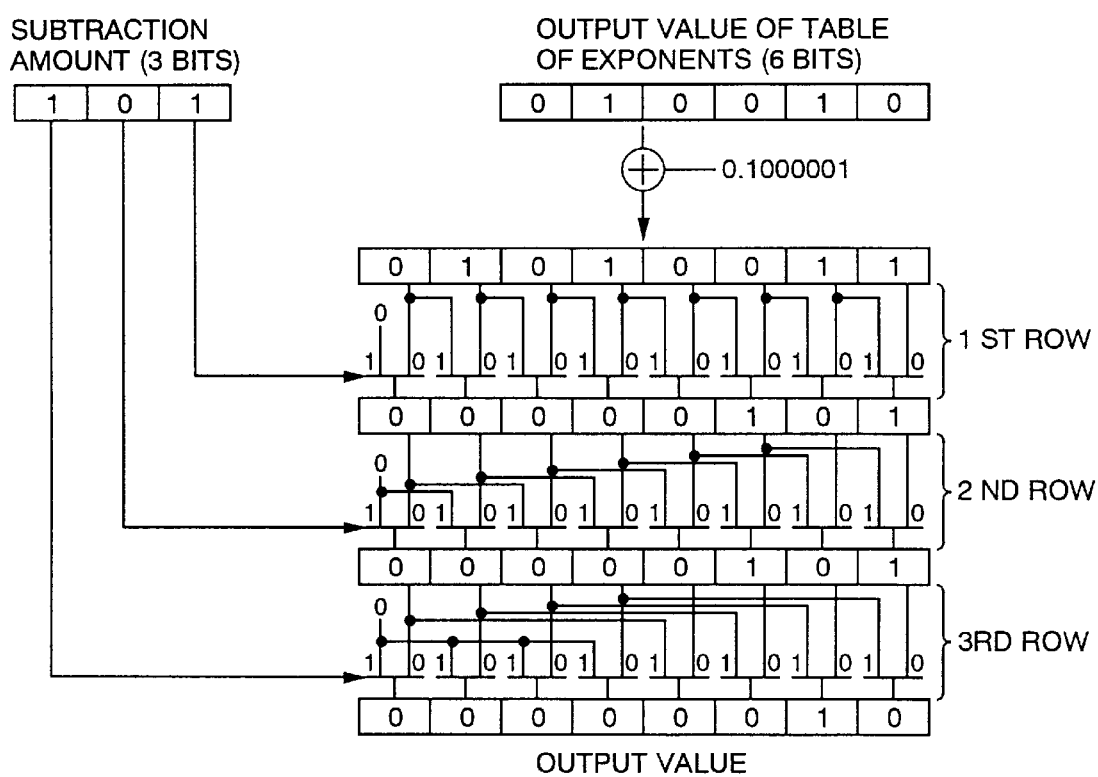
FIG. 7 is a drawing showing the circuit constitution of an exponent shift unit.

The circuit diagram of the exponent shift unit 133 which operates as mentioned above is shown in FIG. 7.

The input of the exponent shift unit is the subtraction amount 3 bits long which is an output from the exponent subtraction unit and the output 6 bits long from the table of exponents 132. To the output from the table of exponents 132, the fixed-point number 0.1000001 8 bits long is added immediately after input. The addition result is a fixed-point number 8 bits long.

The logic relating to shift is broadly divided into three rows.

In the first row, when the low-order digit of the subtraction number is 1, the addition result is shifted right one bit position and when the low-order digit of the subtraction number is 0, the addition result is not shifted right.

Next, in the second row, when the second digit of the subtraction number is 1, the shift result of the addition result in the first row is shifted right 2 bits and when the second digit of the subtraction number is 0, the shift result of the addition result in the first row is not shifted right.

Finally, in the third row, when the high-order digit of the subtraction number is 1, the shift result of the addition result in the second row is shifted right 4 bits and when the high-order digit of the subtraction number is 0, the shift result of the addition result in the second row is not shifted right.

In this embodiment, when all the multiplication units are mounted in a 0.35-$\mu$m CMOS, an about-7.5 k gate is required and the operation is completed within about 35 ns. By doing this, light source calculation can be embedded in the GPIF 800 chip and the processing of the geometry processor 860 can be reduced, so that the performance of the system can be improved about 2 times.

Since the digital power arithmetic unit of the present invention performs operations by referring to the tables as mentioned above, the operation result can be obtained more rapidly than loop calculation.

By dividing the table into two parts such as the table of logarithms and table of exponents, inputs of the tables can be unified to one and the capacity of each table can be reduced.

The capacity of the table of logarithms can be reduced more by multiplying, when an input value of the logarithm calculation unit is not included in the input value range of the table of logarithms, the input value by 2L for an appropriate integer L, setting the multiplication result as input of the table of logarithms, referring to the table of logarithms, and then adding L to the referred value and the capacity of the table of exponents can be reduced by subtracting, when an input value of the exponent calculation unit is not included in the input value range of the table of exponents, an appropriate integer M from the input value, setting the subtraction result as input of the table of exponents, referring to the table of exponents, and then multiplying the referred value by 2-M.

Figure 11:
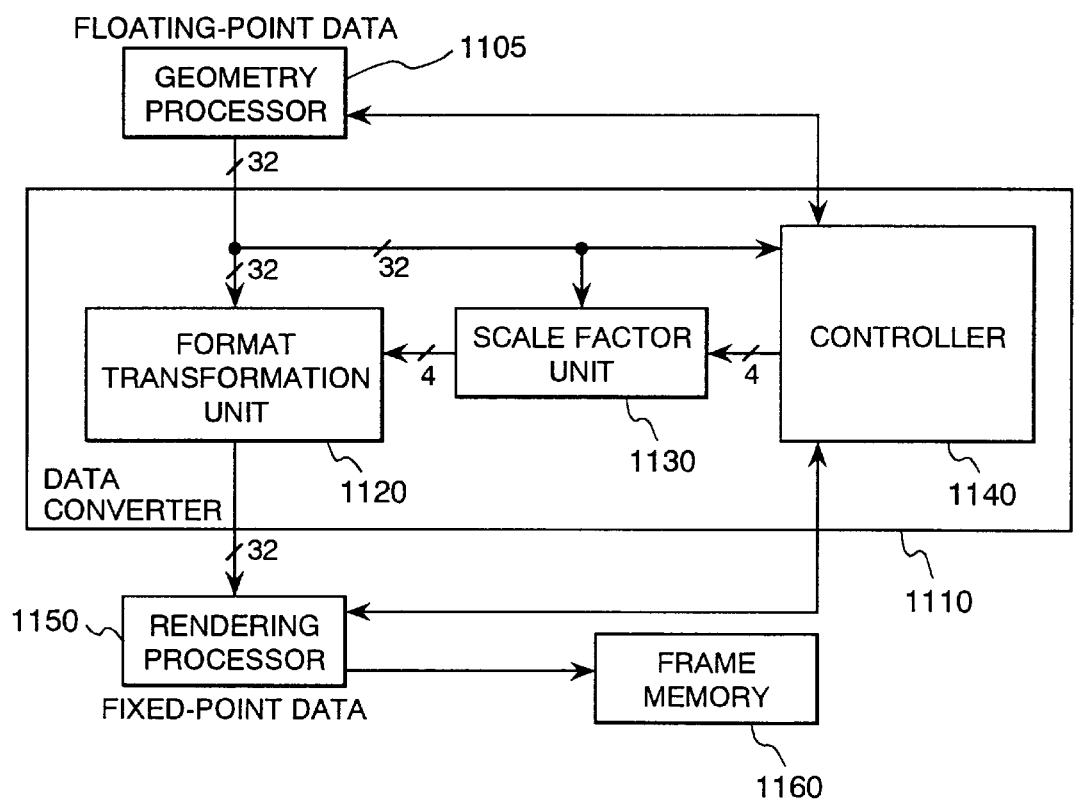
FIG. 11 is a block diagram showing the constitution of a graphics processing unit.

FIG. 11 shows the constitution of a graphics processing unit. As shown in the drawing, the graphics processing unit comprises a geometry processor 1105, a data converter 1110, a rendering processor 1150, and a frame memory 1160.

The data converter 1110 comprises a controller 1140, a scale factor unit 1130, and a format transformation unit 1120.

Figure 12:
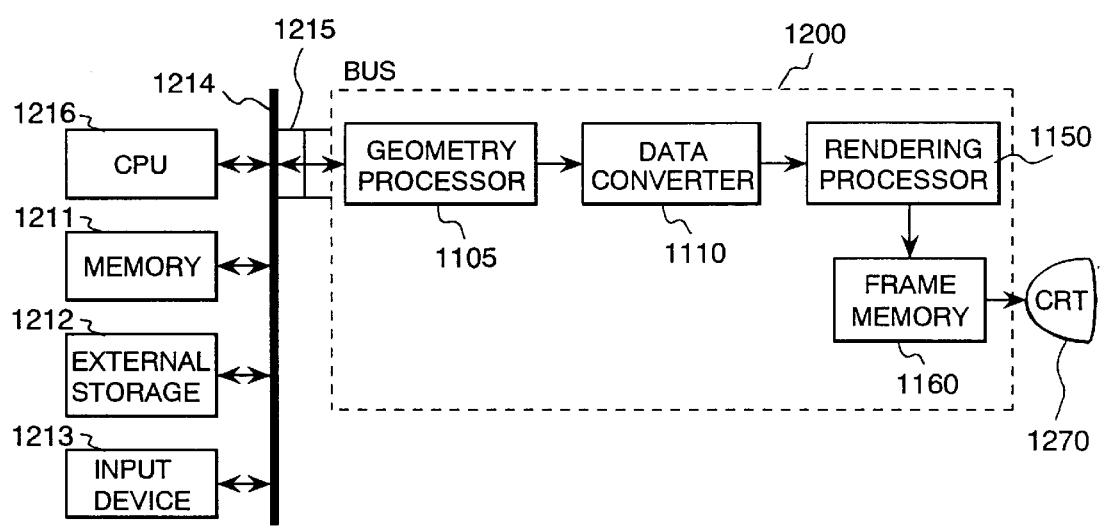
FIG. 12 is a block diagram showing the constitution of a computer to which a graphics processing unit is applied.

The constitution of a graphics processing system to which the graphics processing unit shown in FIG. 11 is applied is shown in FIG. 12.

As shown in the drawing, in this system, a CPU 1216, a memory 1211, an external storage 1212, and an input unit such as a keyboard, mouse, and pen input tablet are connected via a bus 1214. On the bus 1214, a slot 1215 for loading an extended card is provided and this graphics processing unit 1200 realized as an extended card is connected to the bus 1214 via the this slot. To the graphics processing unit 1200, a CRT 1270 which is a display unit is connected.

In this constitution, the CPU 1216 executes an application read from the memory 1211, generates graphics data comprising vertex coordinates, normal vector, and texture given by a graphics command such as a triangle or straight line and a floating-point number, and gives it to the geometry processor 1105 via the system bus.

The geometry processor 1105 performs coordinate transformation, the clipping process, and calculation of the brightness of the light source for the graphics data, transforms a command such as a triangle or straight line and coordinates and brightness data after the geometry process to graphic data comprising a scale factor and floating-point data string, and outputs it to the data transformation unit 1110.

The data transformation unit 1110 transfers drawing data which is obtained by converting the graphic data transferred from the geometry processor 1105 to a fixed-point data string to the rendering processor 1150.

The rendering processor 1150 expands data of a straight line or triangle indicated by the drawing data which is obtained by converting graphic data to a fixed-point number by the data transformation unit 1110 to pixels, performs operations such as Z comparison between the rendering processor 1150 and the frame memory 1160 and alpha blending, and performs a process of storing pixels obtained as an operation result in the frame memory 1160.

The frame memory 1160 is always read and the contents of the frame memory 1160 are displayed on the CRT 1270 which is a display unit.

The graphics processing unit 1200 can be applied to various devices not only the device shown in FIG. 2 but also game devices and computers and word processors having a constitution other than the one shown in FIG. 2.

With respect to details of the graphics processing unit, the data converter 1110 which is a most characteristic part of the present invention will be mainly explained. This data converter 1110 can be applied also to the data converter 812 shown in FIG. 10. Firstly, graphic data inputted to the data converter 1110 from the geometry processor 1105 and drawing data outputted to the rendering processor 1150 from the data converter 1110 will be explained.

Figure 13:
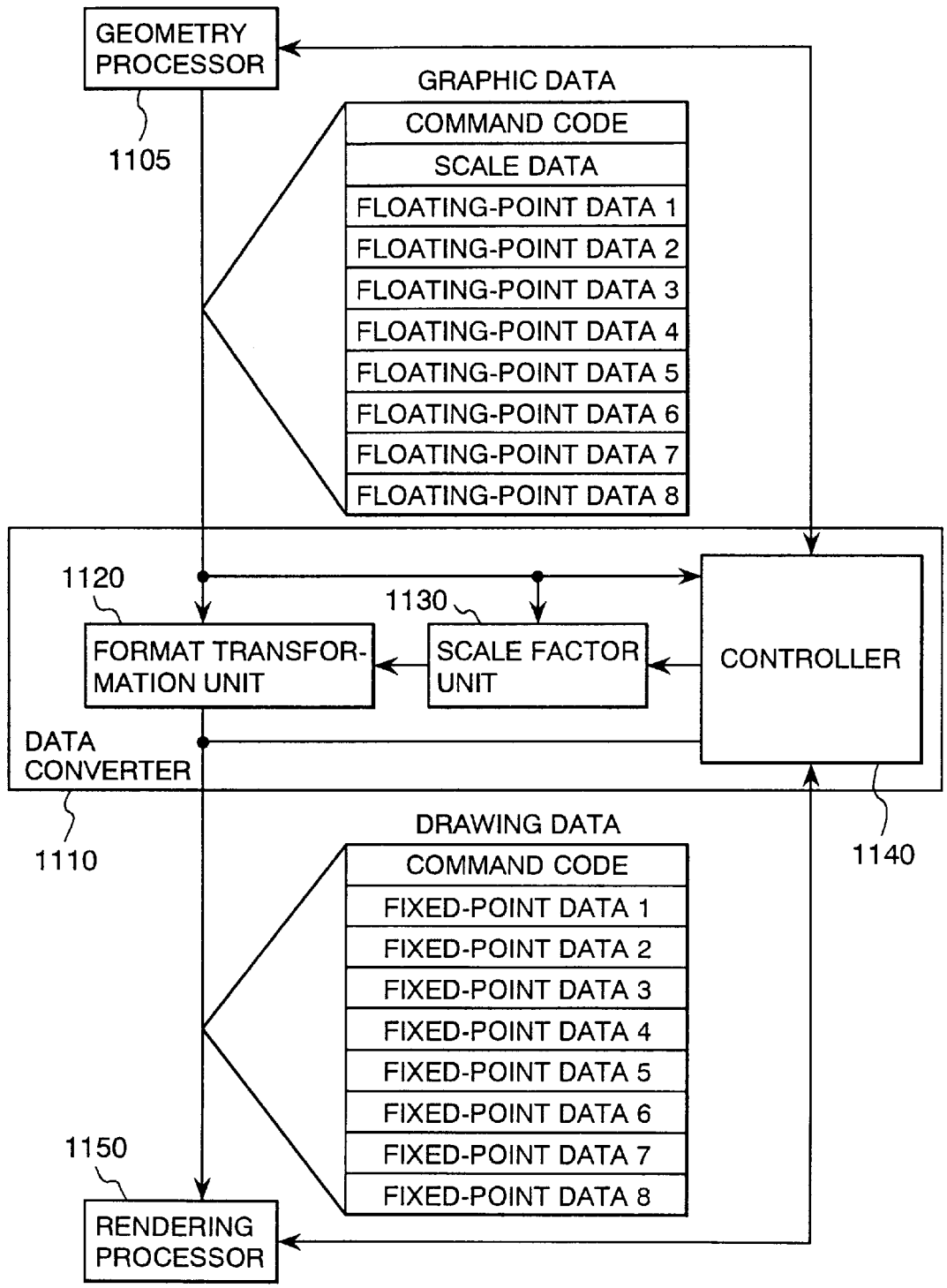
FIG. 13 is a drawing showing input and output data of the data converter of the first embodiment of the present invention.

As shown in FIG. 13, graphic data given to the data converter 1110 from the geometry processor 1105 comprises a command code, scale data, and floating-point data 1 to 8.

For example, in graphic data of a straight line, a drawing command of a straight line, a transfer number 7, and an address are inputted into the command code field, and a scale factor to be used to convert floating-point data 1 to 7 to fixed-point data 1 to 7 is inputted into the scale data field, and the X coordinate of the start point of floating-point data is inputted into the floating-point data 1 field, and the Y coordinate of the start point of floating-point data is inputted into the floating-point data 2 field, and the X coordinate of the end point of floating-point data is inputted into the floating-point data 3 field, and the Y coordinate of the end point of floating-point data is inputted into the floating-point data 4 field, and the brightness R of floating-point data is inputted into the floating-point data 5 field, and the brightness G of floating-point data is inputted into the floating-point data 6 field, and the brightness B of floating-point data is inputted into the floating-point data 7 field.

As shown in FIG. 13, the data converter 1110 receives such graphic data and transfers the command code and the fixed-point data 1 to 8 which convert the floating-point data 1 to 8 to fixed-point data to the rendering processor 1150 as drawing data.

For example, in drawing data converted from the aforementioned graphic data of a straight line, a drawing command of a straight line, a transfer number 7, and an address are inputted into the command code field, and the X coordinate of the start point of fixed-point data is inputted into the fixed-point data 1 field, and the Y coordinate of the start point of fixed-point data is inputted into the fixed-point data 2 field, and the X coordinate of the end point of fixed-point data is inputted into the fixed-point data 3 field, and the Y coordinate of the end point of fixed-point data is inputted into the fixed-point data 4 field, and the brightness R of fixed-point data is inputted into the fixed-point data 5 field, and the brightness G of fixed-point data is inputted into the fixed-point data 6 field, and the brightness B of fixed-point data is inputted into the fixed-point data 7 field.

The format of input and output data of the data converter 1110 mentioned above is shown in FIG. 14.

The command code comprises an operation code, other control codes, a transfer number, and an address. In the operation code field, the operation content to be instructed to the rendering processor 1150 is written, and in the transfer number field, the number of data of fixed-point number to be transferred to the rendering processor 1150 is written, and in the address field, the register of the rendering processor 1150 which is a writing destination of graphic data is written. In the other control codes field, control information to be notified to the rendering processor 1150 or the data converter 1110 from the geometry processor 1105 is stored as required.

Next, the scale data includes Scale1 to Scale8 and a scale factor is written in each scale field. Scale1 corresponds to the floating-point data 1 and the fixed-point data 1 shown in FIG. 13, and Scale2 corresponds to the floating-point data 2 and the fixed-point data 2, and the same may be said with Scale3 to Scale8. In this case, for example, when the value of Scale1 is 3, it indicates that the position of decimal point of the fixed-point data 1 to be transferred to the rendering processor 1150 from the data converter 1110 is at the third bit from the low-order position and when the value of Scale2 is 5, it indicates that the position of decimal point of the fixed-point data 2 to be transferred to the rendering processor 1150 from the data converter 1110 is at the fifth bit from the low-order position.

Next, the floating-point data comprises a code 1 bit long, an exponent 8 bits long, and a mantissa 23 bits long in the known single floating-point representation of IEEE.

Finally, the fixed-point data comprises a code, an integer part, and a fraction part and the bit position of decimal point varies with the scale factor.

The operation of the data converter 1110 will be explained hereunder.

In the data converter 1110, the controller 1140 gives an instruction for setting scale factors and deciding a scale factor to be used so as to decode the command code of graphic data comprising a command code, scale data, and floating-point data generated by the geometry processor 1105 and to convert the floating-point data to fixed-point data.

The scale factor unit 1130 operates according to a control signal for issuing an instruction to set a scale factor string and to use which scale factor from the controller 1140 and gives the scale factor, that is, the bit position of decimal point of the fixed-point number to the format transformation unit 1120.

The format transformation unit 1120 converts the floating-point data from the geometry processor 1105 to fixed-point data so as to correspond to the scale factor received from the scale factor unit 1130 and gives it to the rendering processor 1105.

Each unit will be explained in detail hereunder.

Figure 15:
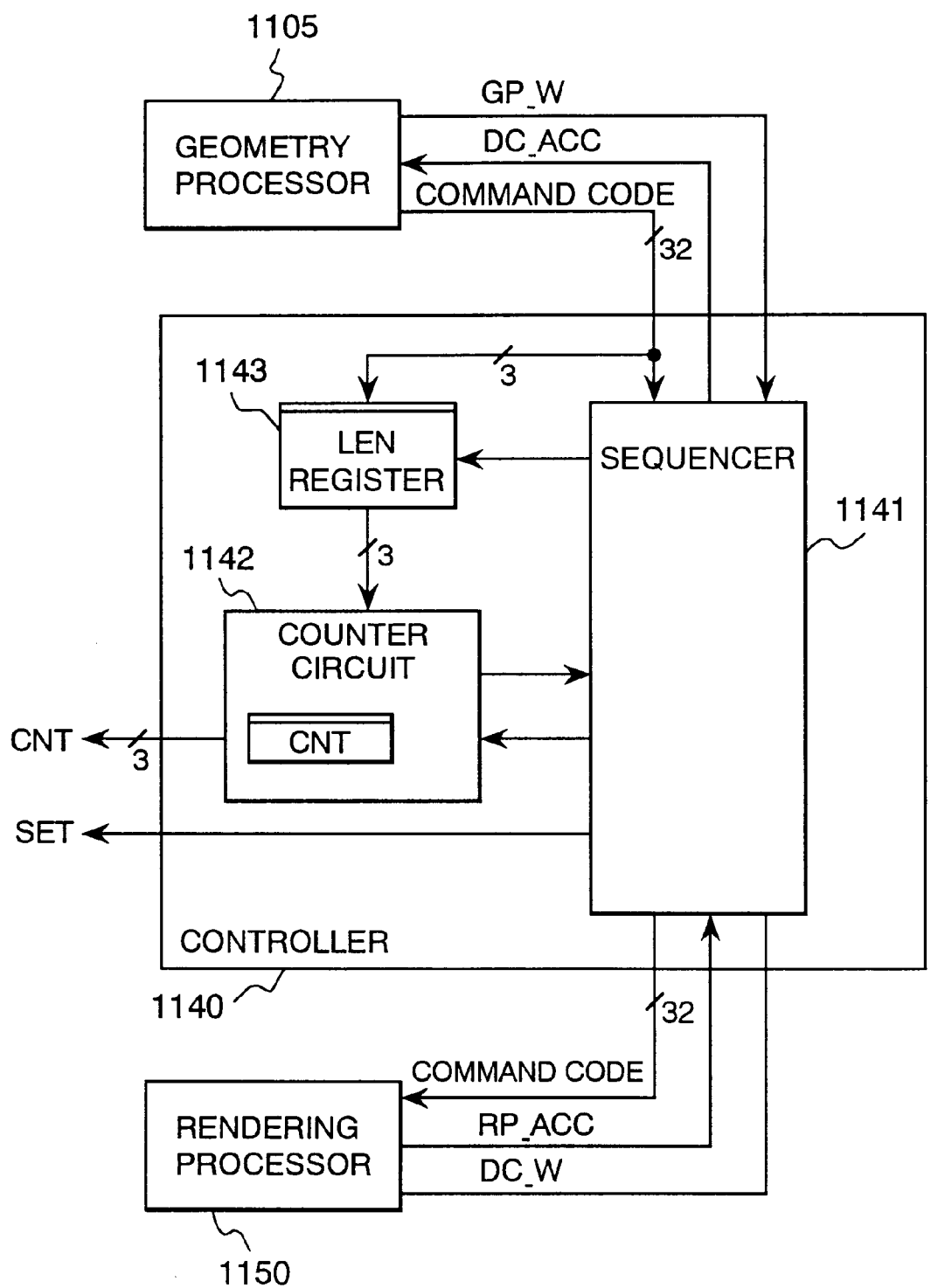
FIG. 15 is a block diagram showing the constitution of the control unit of the first embodiment of the present invention.

FIG. 15 shows the constitution of the controller 1140.

The controller 1140 comprises a sequencer 1141 for controlling the status of the data converter 1110 and controlling transfer of graphic data and drawing data for the geometry processor 1050 and the rendering processor 1150, a counter circuit 1142 for controlling the number of data of fixed-point number to be transferred to the rendering processor 1150, and a LEN register 1143 for storing the transfer number included in the command code.

The statuses controlled by the sequencer 1141 are the status that the data converter 1110 receives the command code from the geometry processor 1105, the status that it receives scale data, and the status that it receives the floating-point data 1 to 8.

In the status that the command code is received, the sequencer 1141 outputs an instruction for setting the transfer number in the command code to the LEN register 1143, outputs an instruction for initializing the CNT register indicating the number of fixed-point data transferred to the rendering processor 1150 to the counter circuit 1142, outputs a command code writing request DC_W signal among the drawing data to the rendering processor 1150, and transfers the command code to the rendering processor 1150. When an RP_ACC signal indicating that the drawing data command code is received from the rendering processor 1150 is returned, the sequencer 1141 outputs a DC_ACC signal indicating that the command code is received to the geometry processor 1105 and moves the status to the status that the scale data is received.

Next, in the status that the scale data is received, the sequencer 1141 outputs an instruction SET signal for writing scale data to the scale factor unit 1130, outputs a DC_ACC signal indicating that the scale data is received to the geometry processor 1105, and moves the status to the status that the floating-point data 1 to 8 are received.

Next, in the status that the floating-point data 1 to 8 are received, the sequencer 1141 outputs a fixed-point data writing request DC_W signal to the rendering processor 1150 and when an RP_ACC signal indicating that the fixed-point data is received from the rendering processor 1150 is returned, the sequencer 1141 outputs a DC_ACC indicating that the C2 graphic data is received to the geometry processor 1105.

Furthermore, in the status that the floating-point data 1 to 8 are received, when the sequencer 1141 receives an instruction for returning the status to the status that the command code is received from the counter circuit 1142, the sequencer 1141 moves the status to the status that the command code is received. When the command code is not received, the sequencer 1141 repeats the aforementioned operation in the status that the floating-point data 1 to 8 are received.

The counter circuit 1142 outputs an instruction for returning to the status that the command code is received as mentioned below.

As mentioned above, the LEN register 1143 is a register for storing the transfer number in the command code and stores it according to the instruction for setting the transfer number in the command code from the sequencer 1141 and outputs the stored value to the counter circuit 1142. The counter circuit 1142 comprises a CNT register and a comparator. The CNT register initializes the register value to 0 when it receives an initialization instruction from the sequencer 1141 and gives the value of the CNT register to the scale factor unit 1130 and when an RP_ACC signal indicating that the fixed-point data of drawing data is received from the rendering processor 1150 is returned in the status that the sequencer 1141 receives the floating-point data 1 to 8, the sequencer 1141 increments the value of the CNT register. The comparator compares the incremented value of the CNT register and the value of the LEN register. When the value of the CNT register and the value of the LEN register agree with each other, the comparator gives an instruction for returning to the status that the command code is received to the sequencer 1141.

Figure 16:
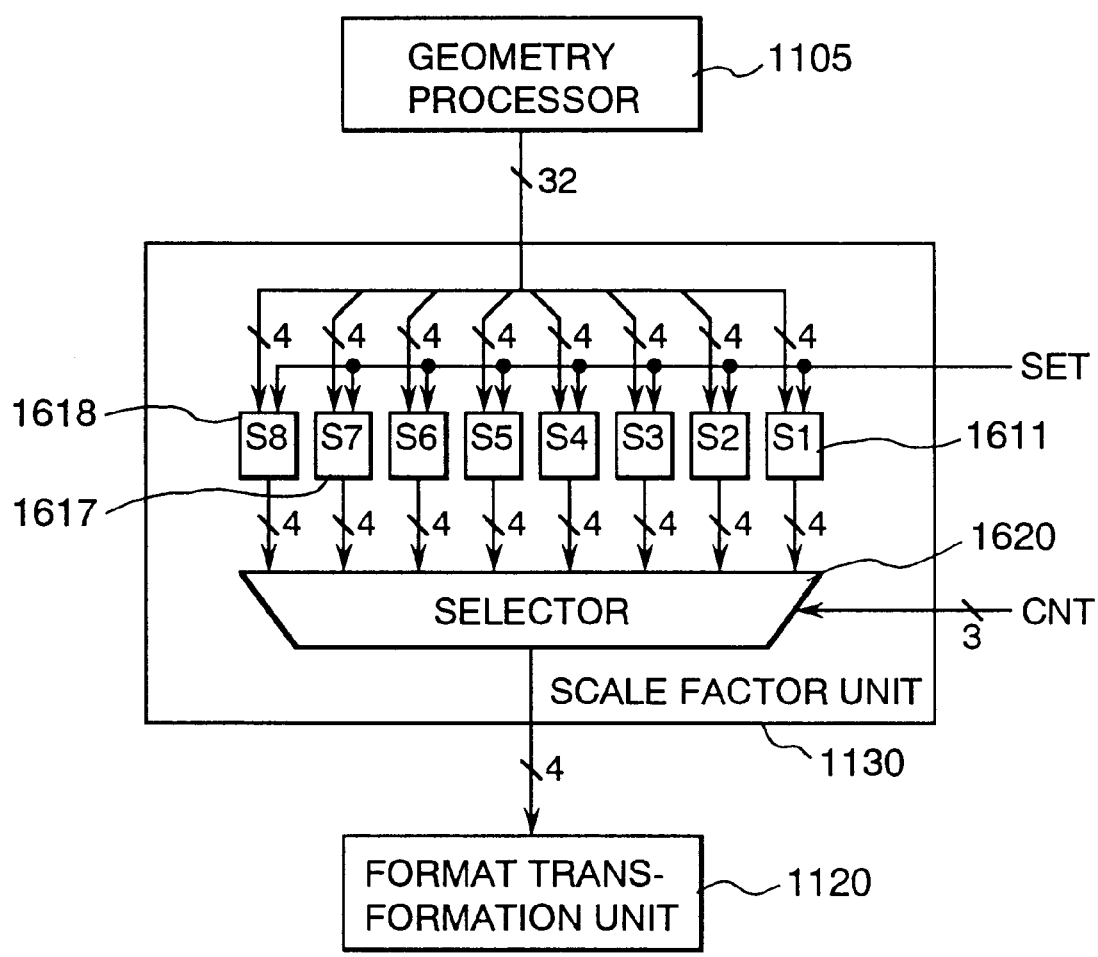
FIG. 16 is a block diagram showing the constitution of the scale factor unit of the first embodiment of the present invention.

Next, the constitution of the scale factor unit 1130 is shown in FIG. 16.

As shown in the drawing, the scale factor unit 1130 comprises registers S1 1611, S2 1612, S3 1613, S4 1614, S5 1615, S6 1616, S7 1617, and S8 1618 and a selector.

The registers S1 1611 to S8 1618 are registers preserving a scale factor corresponding to each of the floating-point data 1 to 8 and when a writing instruction SET signal is received from the controller 1140, the registers divide and write 32-bit scale data transferred from the geometry processor 1105 into 4 bits each.

The selector 1620 selects one of the values of the registers S1 1611 to S8 1618 according to a counter value CNT signal inputted from the controller 1140 and outputs it to the format transformation unit 1120. By doing this, a scale factor corresponding to each of the floating-point data 1 to 8 of graphic data can be given to the format transformation unit 1120.

Figure 17:
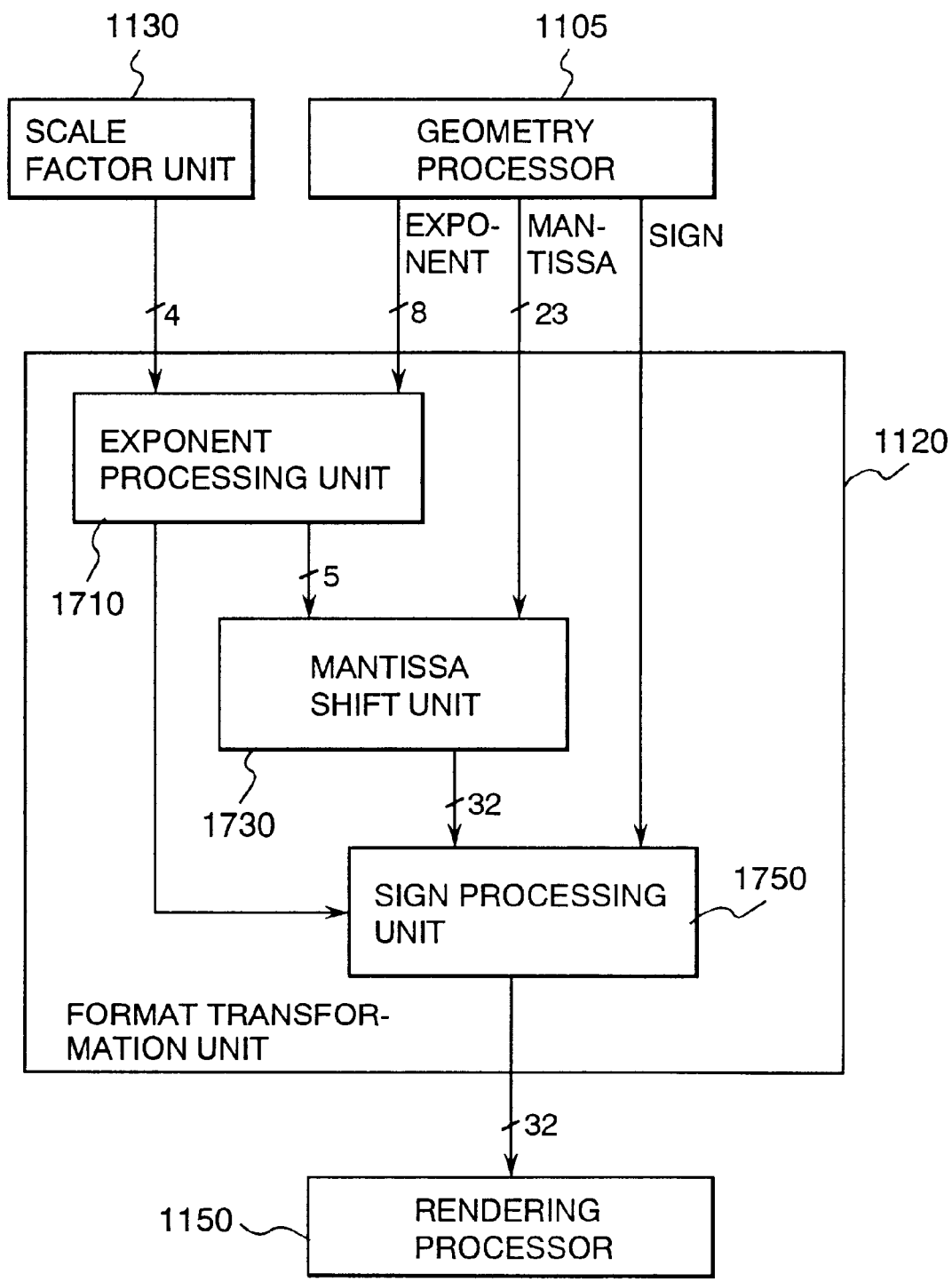
FIG. 17 is a block diagram showing the constitution of the format transformation unit of the first embodiment of the present invention.

Next, the constitution of the format transformation unit 1120 is shown in FIG. 17.

As shown in the drawing, the format transformation unit 1120 comprises an exponent processing unit 1710 for obtaining a shift amount from the scale factor and the exponent of floating-point number, a mantissa shift unit 1730 for shifting the mantissa of a floating-point number right and converting it to a positive fixed-point number, and a sign processing unit 1750 for converting the positive fixed-point number obtained by the mantissa shift unit to a negative fixed-point number when the sign of the floating-point number is negative.

The exponent processing unit 1710 adds the value of scale factor outputted from the scale factor unit 1130 to the exponent of the floating-point number, performs offset correction by subtracting an offset value of 127 from the addition result, performs bit inversion by pulling out only the lower 5 bits, and then obtains the shift amount of the mantissa shift unit 1730.

The reason that an offset value of 127 is subtracted from the addition result is that an offset of 127 is added to the exponent of the floating-point number in the IEEE standard. The reason that only the lower 5 bits are pulled out is that the shift amount requires only 5-bit information so as to convert to a 32-bit fixed-point number. The reason that bit inversion is performed is that although the value of exponent is to be shifted left, it is transformed to a right shift.

When a value obtained by adding the value of scale factor outputted from the scale factor unit 1130 to the exponent of the floating-point number is less than a constant of 127, even if an attempt is made to convert to a 32-bit fixed-point number, the value is too small to be represented, so that the exponent processing unit 1710 also performs a process of outputting an instruction for clamping the data of fixed-point number to 0 to the sign processing unit 1750.

Next, the mantissa shift unit 1730 puts 1 in the most significant bit, puts a 23-bit mantissa of the floating-point number in bits 30 to 8, obtains a 32-bit coefficient when bits 7 to 0 are set to 0, shifts the 32-bit coefficient right the shift amount obtained by the exponent processing unit 1710, and converts it to a positive fixed-point number. The reason that 1 is put in the most significant bit of the 32-bit coefficient is that 1 at the most significant position of the mantissa is omitted in the IEEE standard.

Next, when the sign of the floating-point number is negative, the sign processing unit 1750 converts the positive fixed-point data obtained by the mantissa shift unit 1730 to negative fixed-point data and furthermore when clamping is instructed from the exponent processing unit 1710, the sign processing unit 1750 sets the fixed-point data to 0 and transfers the fixed-point data to the rendering processor 1150.

Next, an example that a floating-point number of 2.625 is converted to a fixed-point number with the fraction part 3 bits long will be shown.

In the floating-point number 2.625, the sign bit is represented by $(0)_2$, and the exponent by $(10000000)_2$, and the mantissa by $(01110000000000000000000)_2$.

When the exponent processing unit 1710 adds the bit position of decimal point and the exponent, $(10000011)_2$ is obtained and when it performs offset correction by subtracting 127, $(00000100)_2$ is obtained.

Then, when the lower 5 bits are pulled out, $(00100)_2$ is obtained, and when bit inversion is performed, $(11011)_2$ is obtained, and the shift amount becomes 27.

The 32-bit coefficient of the mantissa shift unit 1730 becomes $(10101000000000000000000000000000)_2$, and when it is shifted right 27 bits, it becomes $(00000000000000000000000000010101)_2$, and a positive fixed-point number can be obtained.

The part more than 3 bits from the low-order position which is an integer part indicates 2 and the part of the lower 3 bits which is a fraction part indicates 0.625.

In the sign processing unit 1750, the sign bit $(0)_2$ indicates positive, so that a positive fixed-point number is not converted to a negative fixed-point number and transferred to the rendering processor 1150.

The first embodiment of the graphics processing unit has been explained above.

Next, the second embodiment of the graphics processing unit will be explained.

The whole constitution of the graphics processing unit of the second embodiment is the same as the constitution shown in FIG. 11 and can be applied to the system shown in FIG. 12.

Figure 18:
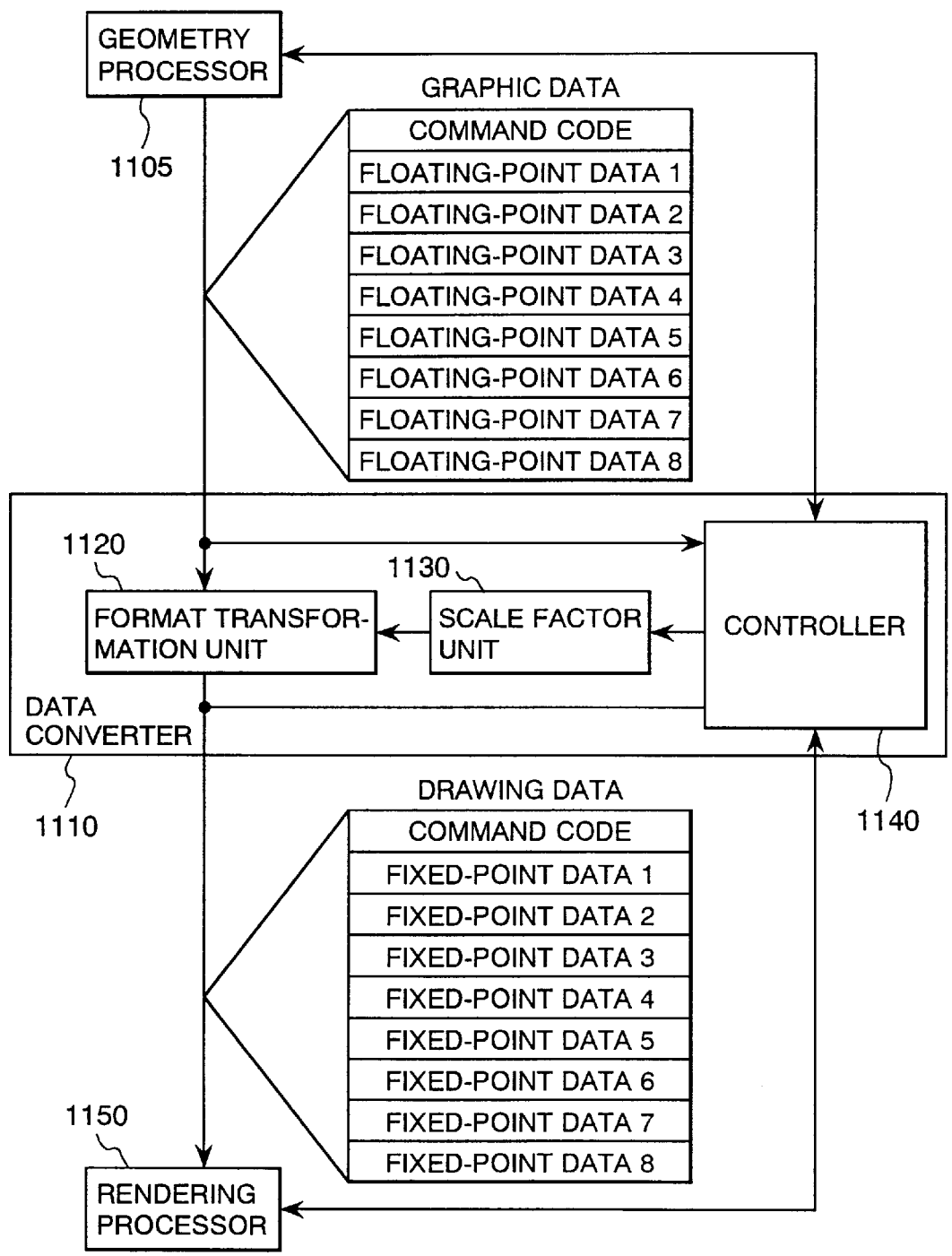
FIG. 18 is a drawing showing input and output data of the data converter of the second embodiment of the present invention.

FIG. 18 shows graphic data inputted to the data converter 1110 from the geometry processor 1105 and drawing data outputted to the rendering processor 1150 from the data converter 1110 in the second embodiment.

As shown in the drawing, the graphic data in the second embodiment is graphic data when the scale data is omitted from the graphic data inputted to the data converter 1110 from the geometry processor 1105 in the first embodiment.

Figure 19:
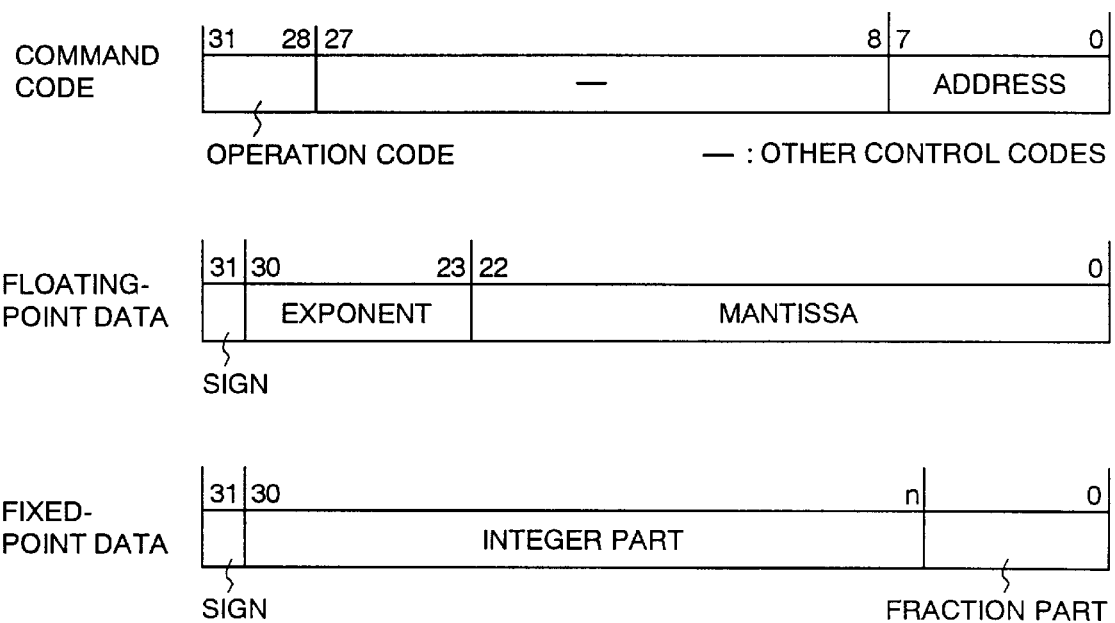
FIG. 19 is a drawing showing the input and output data format of the data converter of the second embodiment of the present invention.

Next, the format of input and output data of the data converter 1110 is shown in FIG. 19.

As shown in the drawing, the formats of floating-point data, fixed-point data, and command data are the same as those explained in the first embodiment.

The constitution of graphic data outputted from the geometry processor 1105 can be specified from the operation code of the command code.

For example, when the operation code is $(0001)_2$, it means a command for drawing a straight line and in this case, it is decided that the floating-point data 1 to 7 indicate the X and Y coordinates of the start point, the X and Y coordinates of the end point, and the brightnesses R, G, and B. On the other hand, when the operation code is $(0010)_2$, it means a command for drawing a triangle and it is decided that the floating-point data 1 to 5 indicate the X and Y coordinates of the vertex and the brightnesses R, G, and B. When one triangle is to be displayed on the CRT 700, the graphic data of the triangle is given to the rendering processor 500 three times.

As mentioned above, for the value of the operation code, the kind of each floating-point data following the command code including the operation code is decided. Therefore, in the second embodiment, by deciding the bit position of decimal point of the fixed-point data to which the floating-point data is converted according to the preset correspondence depending on the operand code and the position of floating-point data so that, for example, when the operation code is $(0001)_2$, the data converter 1110 converts the X coordinate of the start point of the floating-point data 1 to the fixed-point data 1 whose decimal point is located at the third bit from the low-order position and converts the Y coordinate of the start point of the floating-point data 2 to the fixed-point data 2 whose decimal point is located at the second bit from the low-order position and when the operation code is $(0010)_2$, the data converter 1110 converts the X coordinate of the vertex of the floating-point data 1 to the fixed-point data 1 whose decimal point is located at the fourth bit from the low-order position and converts the Y coordinate of the vertex of the floating-point data 2 to the fixed-point data 2 whose decimal point is located at the second bit from the low-order position, each floating-point data is converted to a fixed-point number having the bit position of decimal point according to the data kind without receiving the scale data from the geometry processor 1105 like the first embodiment.

The data converter 1110 for performing such a conversion will be explained in detail hereunder. The whole constitution of the data converter 1110 is the same as that shown in FIG. 11 and the data converter 1110 comprises the controller 1140, the scale factor unit 1130, and the format transformation unit 1120.

Figure 20:
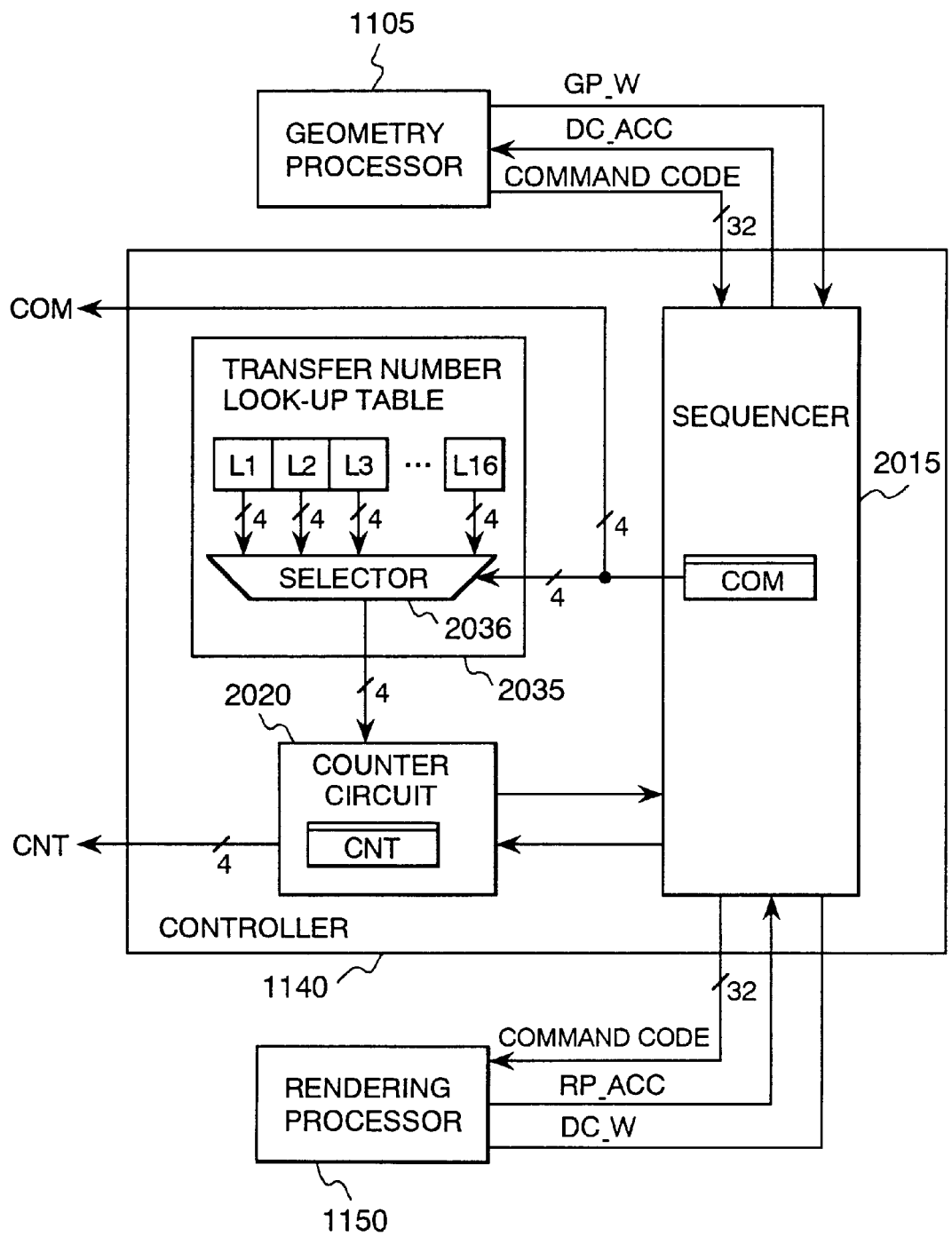
FIG. 20 is a block diagram showing the constitution of the control unit of the second embodiment of the present invention.

FIG. 20 shows the constitution of the controller 1140.

As shown in the drawing, the controller 1140 comprises a sequencer 2015 for controlling the status of the data converter 1110 and controlling transfer of graphic and drawing data for the geometry processor 1050 and the rendering processor 1150, a counter circuit 2020 for controlling the number of data of fixed-point number to be transferred to the rendering processor 1150, and a transfer number look-up table 2035 for detecting the transfer number in the command code from the operation code.

The statuses controlled by the sequencer 2015 are the status that the data converter receives the command code from the geometry processor 1105 and the status that it receives the floating-point data 1 to 8.

In the status that the command code is received, the sequencer 2015 stores the operation code of the command code in the COM register, outputs the content of the operation code to the transfer number look-up table 2035, outputs an instruction for initializing the CNT register to the counter circuit 2020, outputs a drawing data command code writing request DC_W signal to the rendering processor 1150, and transfers the command code to the rendering processor 1150. When an RP_ACC signal indicating that the drawing data command code is received from the rendering processor 1150 is returned, the sequencer 1141 outputs a DC_ACC signal indicating that the graphic data is received to the geometry processor 1105 and moves the status to the status that the floating-point data 1 to 8 are received.

Next, in the status that the floating-point data 1 to 8 are received, the sequencer 2015 gives the value of the COM register storing the operation code to the scale factor unit 1130, outputs a fixed-point data writing request DC_W signal to the rendering processor 1150, and when an RP_ACC signal indicating that the fixed-point data is received from the rendering processor 1150 is returned, the sequencer 2015 outputs a DC_ACC signal indicating that the floating-point data is received to the geometry processor 1105. Furthermore, in the status that the floating-point data 1 to 8 are received, when the sequencer 2015 receives an instruction for returning the status to the status that the command code is received from the counter circuit 2020, the sequencer 2015 moves the status to the status that the command code is received. When the command code is not received, the sequencer 2015 repeats the aforementioned operation in the status that the floating-point data 1 to 8 are received.

The transfer number look-up table 2035 registers the values of transfer numbers of fixed-point data L1 to L16 for each operation code, selects one value from them according to the value of the COM register outputted from the sequencer 2015 by a selector 2036, and gives it to the counter circuit 2020.

For example, when a transfer number of 7 is registered in L1 and a transfer number of 5 is registered in L2 and the value of the COM register, that is, the operation code is $(0001)_2$, the transfer number 7 is given to the counter circuit 2020 and when the value of the COM register is $(_{0010})_2$, the transfer number 5 is given.

The counter circuit 2020 comprises a CNT register and a comparator. The CNT register initializes the register value to 0 when it receives an initialization instruction from the sequencer 2015 and gives the value of the CNT register to the scale factor unit 1130 and when an RP_ACC signal indicating that the fixed-point data of drawing data is received from the rendering processor 1150 is returned in the status that the sequencer 2015 receives the floating-point data 1 to 8, the sequencer 2015 increments the value of the CNT register. The comparator compares the incremented value of the CNT register and the transfer number sent from the transfer number look-up table 2035. When the both values agree with each other, the comparator gives an instruction for returning to the status that the command code is received to the sequencer 2015.

Figure 21:
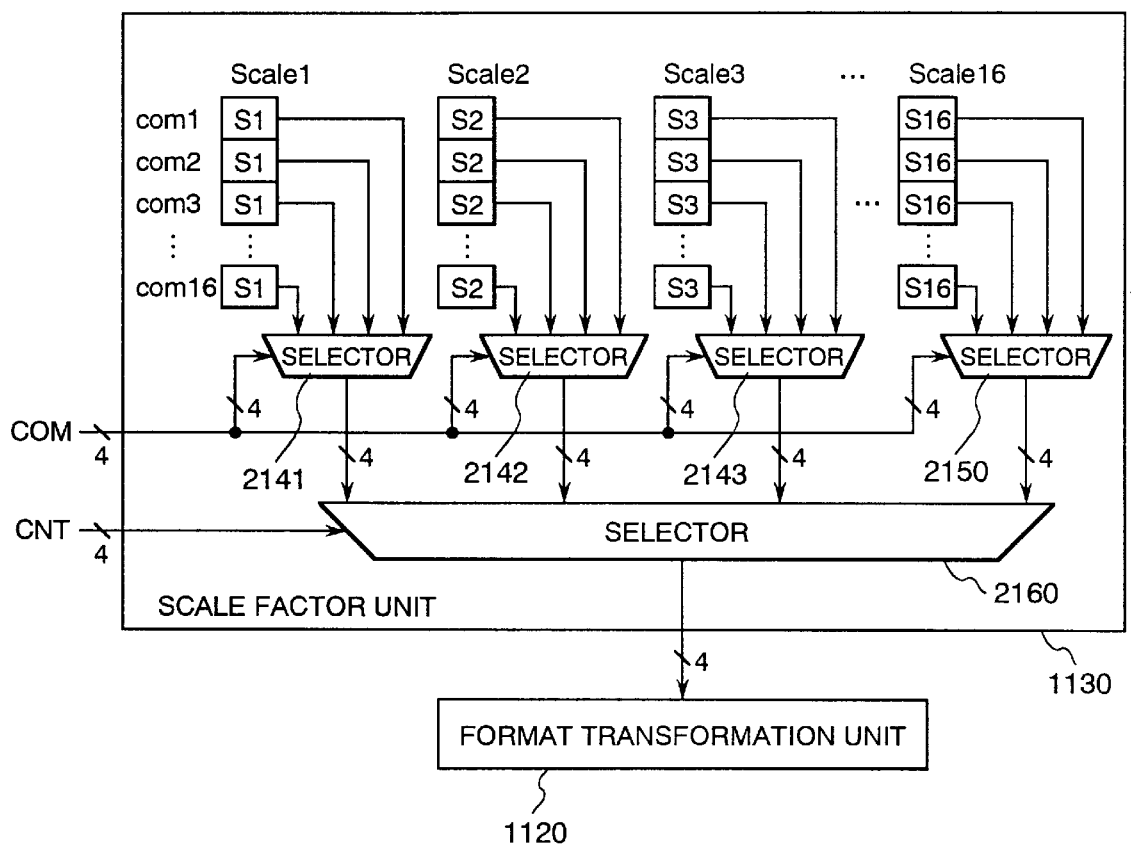
FIG. 21 is a block diagram showing the constitution of the scale factor unit of the second embodiment of the present invention.

FIG. 21 shows the constitution of the scale factor unit 1130.

The scale factor unit 1130 has a table for registering scale factors of Scale1 to Scale 16 for each operation code.

One of a plurality of scale factors stored in the table of Scale1 is selected by a selector 2141 according to a COM signal of the value of the COM register outputted from the controller 1140 and outputted to a selector 2160. Also for Scale2 to Scale16, a scale factor corresponding to a COM signal of each value of the COM register is selected and outputted to the selector 2160.

Next, the numerical values of Scale1 to Scale16 selected by the selectors 2141 to 2156 are selected one by one by a CNT signal of the counter value inputted from the controller 1140 and outputted to the format transformation unit 1120. By doing this, for each of the floating-point data 1 to 8 of graphic data, the corresponding scale factor can be given to the format transformation unit 1120.

The format transformation unit 1120 is the same as the format transformation unit 1120 mentioned above.

The second embodiment has been explained above.

With respect to contents of the transfer number look-up tables L1 to L16 storing the transfer number corresponding to the operation code and of the tables S1 to S16 of scale factors in the second embodiment, for example, an optional value may be set from the CPU 1216 or the geometry processor 1105 shown in FIG. 12. By doing this, the format of graphic data can be changed properly.

Next, the third embodiment will be explained.

In the third embodiment, the graphics processing unit of the first embodiment has an additional function for transferring a floating-point data to the rendering processor 1150 in the format just received from the geometry processor 1105 without converting the floating-point data to fixed-point data in the data converter 1110.

Figure 22:
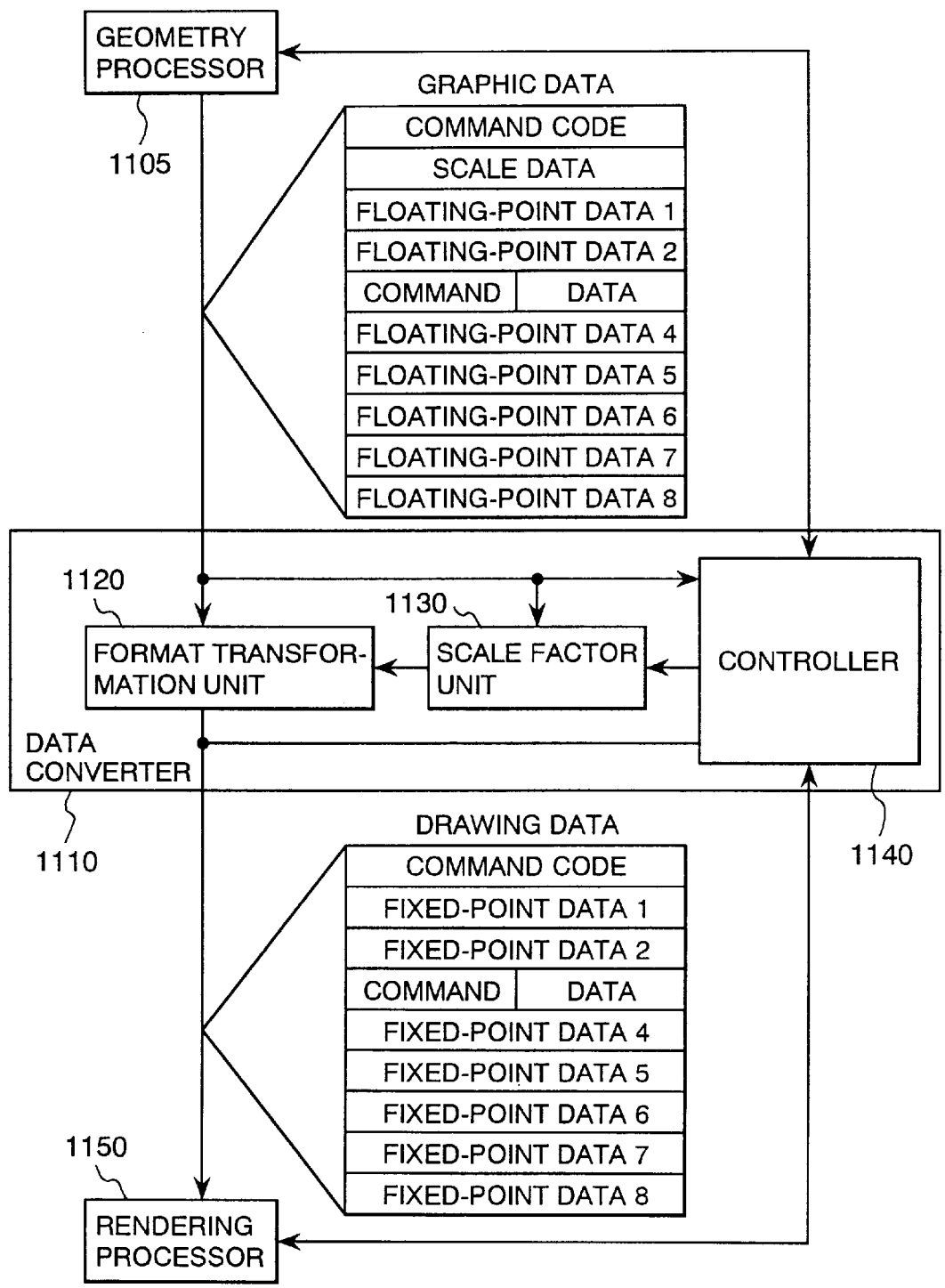
FIG. 22 is a drawing showing input and output data of the data converter of the third embodiment of the present invention.

When there is data to be processed as floating-point data also in the rendering processor 1150 or a format that there is not only floating-point data but also data including the command code among data to be taken over as operation data in the command code as shown in FIG. 22 is used, such a function is valid in transferring those data to the rendering processor 1150 as they are.

Figure 23:
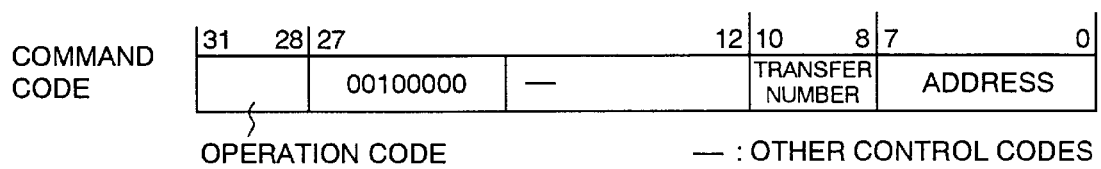
FIG. 23 is a drawing showing the format of command data of the third embodiment of the present invention.

FIG. 23 shows the format of the command data in this case.

As shown in FIG. 12, in the third embodiment, a conversion control code showing data which is not to be converted to a fixed point is added among the other control codes following the operation code of the command code.

$(00100000)_2$ shown in the drawing indicates the position of the value $(1)_2$, that is, that the third data from the top is to be outputted to the rendering processor 1150 as it is without converting it to fixed-point data in the data converter 1110.

The data converter 1110 of this embodiment will be explained hereunder.

The whole constitution of the data converter 1110 is the same as that shown in FIG. 11 and the data converter 1110 comprises a controller 1140, a scale factor unit 1130, and a format transformation unit 1120. The controller 1140 and the scale factor 1130 may be the same as those explained in the first embodiment.

Figure 24:
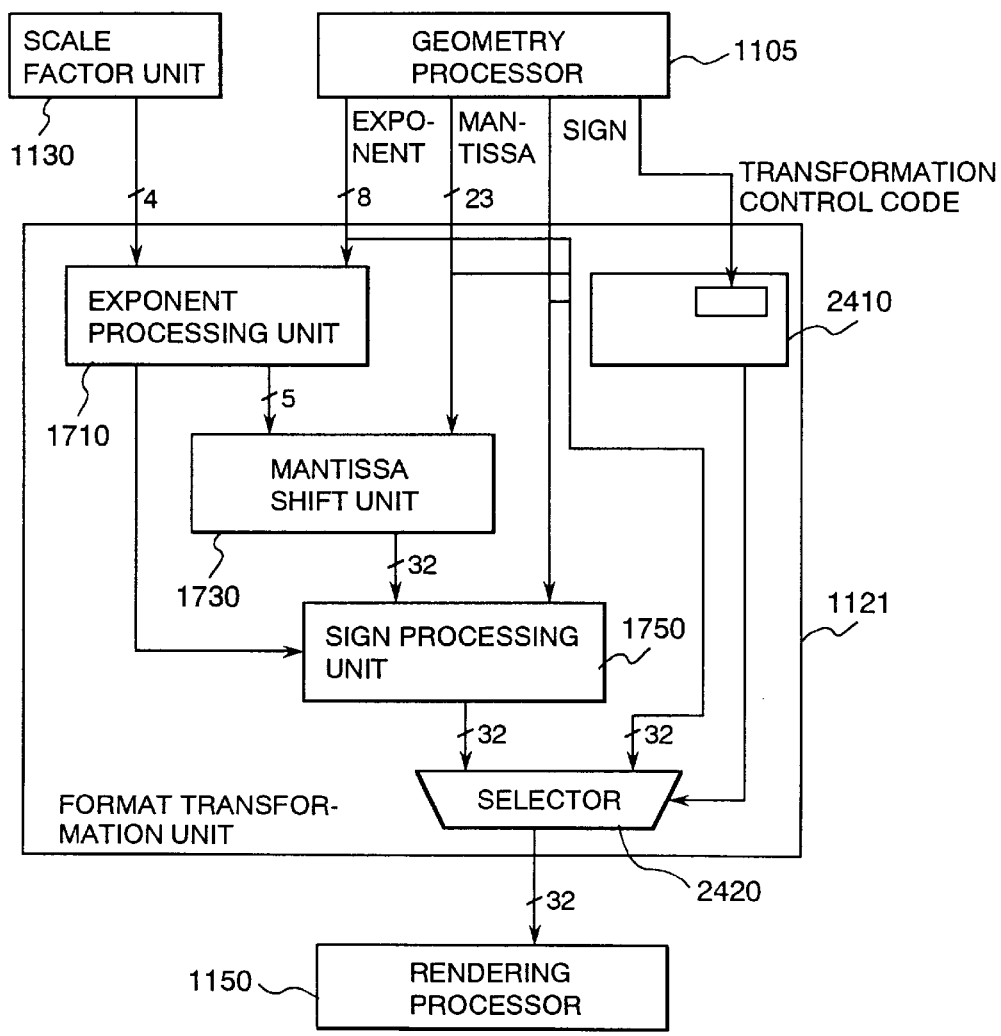
FIG. 24 is a block diagram showing the constitution of the format transformation unit of the third embodiment of the present invention.

Finally, FIG. 24 shows the constitution of the format transformation unit 1121.

As shown in the drawing, the format transformation unit 1121 is the format transformation unit 1120 shown in FIG. 17 to which a control code processing unit 2410 and a selector 2420 are added.

In the control code register in the control code processing unit 2411, the conversion control code in the other control codes in the command code is stored in the status that the sequencer 1141 of the controller 1140 receives the command code.

The control code processing unit 2410 generally controls the selector 2420 so that it selects the fixed-point data outputted by the sign processing unit 1750. However, when the value outputted by the counter circuit 1142 of the controller 1140 becomes equal to the position value (3 or 8 when the conversion control code is $(00100001)_2$) indicating that the conversion control data stored in the register does not convert the data, the control code processing unit 2410 controls the selector 2420 so that it selects the fixed-point data received from the geometry processor 1105.

The third embodiment of the present invention has been explained above.

Figure 14:
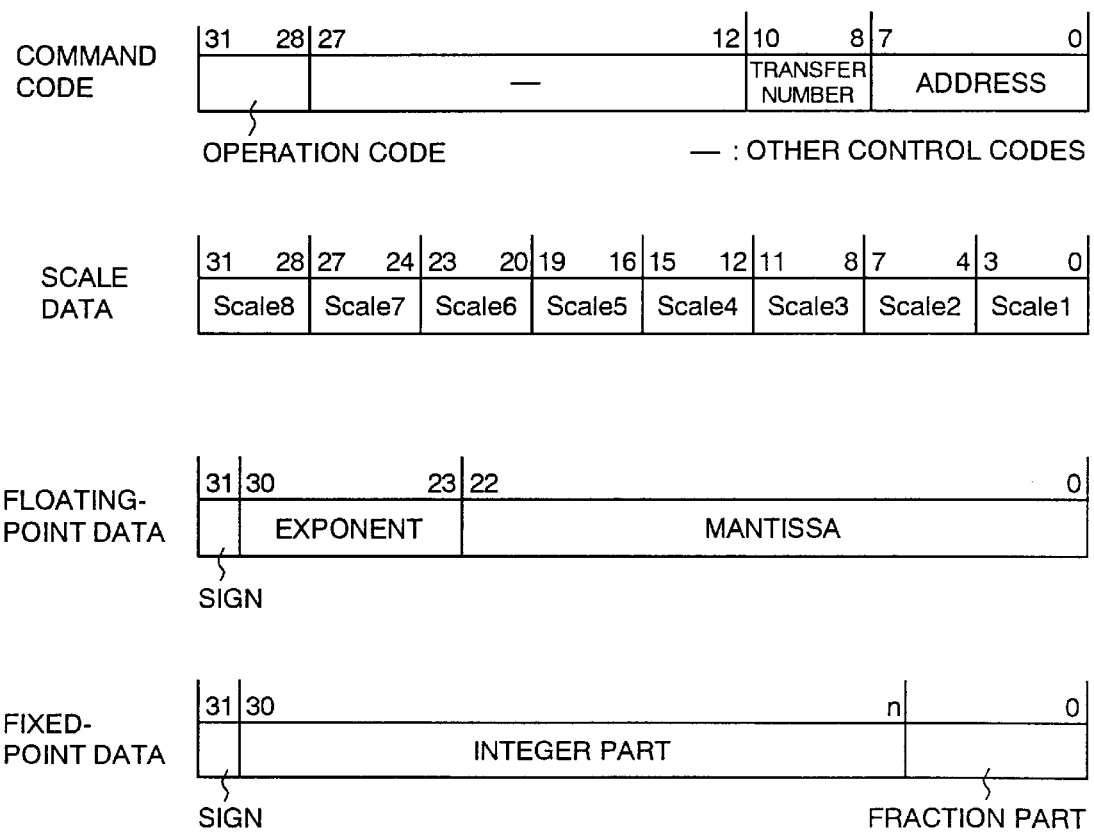
FIG. 14 is a drawing showing the input and output data format of the data converter of the first embodiment of the present invention.

In the graphics processing unit explained in the second embodiment, when the format transformation unit 1120 of the data converter 1110 is structured as shown in FIG. 14, the third embodiment can be applied to the second embodiment in the same as application to the first embodiment.

According to each embodiment explained above, the data converter 1110 is provided between the geometry processor 1105 and the rendering processor 1150 and processing of the geometry processor 1105 and conversion from floating-point data to fixed-point data are performed by the pipeline method, so that high-speed graphics processing is made possible. Furthermore, it is possible to optionally control the bit position of decimal point for each data kind and to disable conversion from a floating-point number to a fixed-point number, so that various data can be handled.

As mentioned above, according to the present invention, a graphics processing unit which can control a reduction in the processing seed requiring for conversion from a floating-point number to a fixed-point number can be provided.

What is claimed is:

1. A graphics processing unit comprising:

a processor for outputting graphic data including a floating-point data string which represents information for specifying a graphic to be drawn in the floating point format;

a rendering unit for expanding and outputting a graphic to pixels according to drawing data including a fixed-point data string which represents the content of a graphic to be drawn in the fixed-point format, and a data converter for converting floating-point data included in said graphic data output by said processor to fixed-point data and outputting it to said rendering unit as said drawing data, said data converter having decimal point position changing means for changing the bit position of decimal point of fixed-point data to which floating-point data is to be converted, said processor outputting scale factor data for designating the bit position of a decimal point of fixed-point data to which each floating-point data is to be converted as said graphic data together with said floating-point data string, and the decimal point changing means of said data converter allowing the bit position of fixed-point data to which said each floating-point data is to be converted to set to the bit position of a decimal point designated by said scale factor data included in said graphic data output by said processor for said floating-point data.

2. A graphics processing unit according to claim 1, wherein said processor outputs a control code for designating floating-point data among said floating-point data included in said floating-point data string which is not converted to fixed-point data as said graphic data together with said floating-point data string and said data converter does not convert floating-point data designated by said control code outputted by said processor to fixed-point data, includes it in said drawing data, and outputs it to said rendering unit.

3. An information processing unit having a graphics processing unit stated in claim 2, a frame memory for storing pixels obtained by expanding and outputting a graphic by said rendering unit, and a display unit for reading and displaying each pixel stored in said frame memory sequentially.

4. An information processing unit having a graphics processing unit as stated in claim 1, and further including a frame memory for storing pixels obtained by expanding and outputting a graphic by said rendering unit, and a display unit for reading and displaying each pixel stored in said frame memory sequentially.

5. A graphics processing unit comprising:

a processor for outputting graphic data including a floating-point data string which represents information for specifying a graphic to be drawn in the floating point format;

a rendering unit for expanding and outputting a graphic to pixels according to drawing data including a fixed-point data string which represents the content of a graphic to be drawn in the fixed-point format, and a data converter for converting floating-point data included in said graphic data output by said processor to fixed-point data and outputting it to said rendering unit as said drawing data, said data converter having decimal point position changing means for changing the bit position of decimal point of fixed-point data to which floating-point data is to be converted, said processor outputting a command for indicating the kind of a graphic specified by said floating-point data string as said graphic data together with said floating-point data string, said data converter having a scale factor table for storing the bit position of decimal point of fixed-point data to which each floating-point data included in said graphic data is converted in correspondence with said each command, and said decimal point changing means of said data converter setting the bit position of a decimal point of fixed-point data to which said each floating-point data is converted to the bit position of a decimal point stored in said scale factor table in correspondence with said command included in the same graphic data as that of said floating-point data.

6. A graphics processing unit according to claim 5, wherein said scale factor table of said data converter has a scale factor table for storing the bit position of decimal point of fixed-point data to which each floating-point data included in said graphic data is converted in correspondence with the position of floating-point data in said graphic data for said each command, and said decimal point changing means of said data converter sets the bit position of decimal point of fixed-point data to which said each floating-point data is converted to the bit position of decimal point stored in said scale factor table in correspondence with said command included in the same graphic data as that of said floating-point data and the position in said graphic data of said floating-point data.

7. A graphics processing unit according to claim 6, wherein said processor outputs a control code for designating floating-point data among said floating-point data included in said floating-point data string which is not converted to fixed-point data as said graphic data together with said floating-point data string and said data converter does not convert floating-point data designated by said control code output by said processor to fixed-point data, includes it in said drawing data, and outputs it to said rendering unit.

8. An information processing unit having a graphics processing unit as stated in claim 7, and further including a frame memory for storing pixels obtained by expanding and outputting a graphic by said rendering unit, and a display unit for reading and displaying each pixel stored in said frame memory sequentially.

9. An information processing unit having a graphics processing unit stated in claim 6, a frame memory for storing pixels obtained by expanding and outputting a graphic by said rendering unit, and a display unit for reading and displaying each pixel stored in said frame memory sequentially.

10. A graphics processing unit according to claim 5, wherein said processor outputs a control code for designating floating-point data among said floating-point data included in said floating-point data string which is not converted to fixed-point data as said graphic data together with said floating-point data string and said data converter does not convert floating-point data designated by said control code output by said processor to fixed-point data, includes it in said drawing data, and outputs it to said rendering unit.

11. An information processing unit having a graphics processing unit stated in claim 10, a frame memory for storing pixels obtained by expanding and outputting a graphic by said rendering unit, and a display unit for reading and displaying each pixel stored in said frame memory sequentially.

12. An information processing unit having a graphics processing unit as stated in claim 5, and further including a frame memory for storing pixels obtained by expanding and outputting a graphic by said rendering unit, and a display unit for reading and displaying each pixel stored in said frame memory sequentially.

* * * * *